(12) United States Patent
Kim et al.

(10) Patent No.: US 11,434,397 B2
(45) Date of Patent: Sep. 6, 2022

(54) DOUBLE-SIDED ADHESIVE FILM FOR BONDING HETEROGENEOUS SUBSTRATES, LAMINATED FILM, AND DISPLAY DEVICE

(71) Applicant: TORAY ADVANCED MATERIALS KOREA INC., Gyeongsangbuk-do (KR)

(72) Inventors: Jae Hoon Kim, Gyeongsangbuk-do (KR); Ji Hoon Lee, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 0 days.

(21) Appl. No.: 17/045,161

(22) PCT Filed: Aug. 26, 2019

(86) PCT No.: PCT/KR2019/010843
§ 371 (c)(1),
(2) Date: Oct. 2, 2020

(87) PCT Pub. No.: WO2020/111454
PCT Pub. Date: Jun. 4, 2020

(65) Prior Publication Data
US 2021/0363392 A1    Nov. 25, 2021

(30) Foreign Application Priority Data
Nov. 29, 2018 (KR) .................. 10-2018-0151224

(51) Int. Cl.
*C09J 7/38* (2018.01)
*C09J 7/25* (2018.01)

(52) U.S. Cl.
CPC .............. *C09J 7/385* (2018.01); *C09J 7/255* (2018.01); *C09J 2203/326* (2013.01);
(Continued)

(58) Field of Classification Search
CPC ........... C09J 7/00–7/50; C09J 2301/21; Y10T 428/00–428/8305
See application file for complete search history.

(56) References Cited

U.S. PATENT DOCUMENTS

| 4,839,206 A | 6/1989 | Waldenberger |
| 9,019,463 B2 | 4/2015 | Ha et al. |

(Continued)

FOREIGN PATENT DOCUMENTS

| JP | 01138284 A | 5/1989 |
| JP | 2003-313520 A | 11/2003 |

(Continued)

OTHER PUBLICATIONS

WIPO; International Search Report and Written Opinion for PCT/KR2019/010843 dated Nov. 27, 2019; 7 pages.

(Continued)

*Primary Examiner* — Prashant J Khatri
(74) *Attorney, Agent, or Firm* — Snell & Wilmer L.L.P.

(57) ABSTRACT

Disclosed are a double-sided adhesive film for bonding heterogeneous substrates, a laminated film, and a display device. The double-sided adhesive film for bonding heterogeneous substrates comprises: a first adhesive layer; and second adhesive layer which is disposed on the first adhesive layer and has a different adhesive force from that of the first adhesive layer to the same substrate.

12 Claims, 4 Drawing Sheets

(52) U.S. Cl.
CPC .... *C09J 2301/1242* (2020.08); *C09J 2301/21* (2020.08); *C09J 2433/00* (2013.01); *C09J 2467/006* (2013.01); *C09J 2483/00* (2013.01)

(56) References Cited

U.S. PATENT DOCUMENTS

| | | | |
|---|---|---|---|
| 2008/0124503 A1 | 5/2008 | Abrams | |
| 2011/0149211 A1* | 6/2011 | Ha | B05D 5/10 359/483.01 |
| 2017/0335142 A1* | 11/2017 | Yamamoto | B32B 27/304 |

FOREIGN PATENT DOCUMENTS

| | | |
|---|---|---|
| JP | 2003313520 A | 11/2003 |
| JP | 2006-232896 A | 9/2006 |
| JP | 2006232896 A | 9/2006 |
| JP | 2010150378 A | 7/2010 |
| KR | 1020180030747 A | 3/2018 |

OTHER PUBLICATIONS

KIPO; Office Action dated Aug. 29, 2019 in Application No. 10-2018-0023903.
KIPO; Notice of Allowance dated Mar. 11, 2020 in Application No. 10-2018-0023903.
CNIPA; Office Action dated Oct. 11, 2021 in Application No. 201980017022.X.
KIPO; Office Action dated Jan. 26, 2022 in Application No. 10-2018-0151224.

* cited by examiner

DOUBLE-SIDED ADHESIVE FILM FOR BONDING HETEROGENEOUS SUBSTRATES, LAMINATED FILM, AND DISPLAY DEVICE

CROSS-REFERENCE TO RELATED APPLICATIONS

This application is a national stage entry of International Patent Application No. PCT/KR2019/010843, filed on Aug. 26, 2019, which claims priority to Korean Patent Application No. 10-2018-0151224, filed on Nov. 29, 2018, the disclosures of which are hereby incorporated by reference in their entirety.

TECHNICAL FIELD

Disclosed are a double-sided adhesive film for bonding heterogeneous substrates, a laminated film, and a display device. More particularly, disclosed are a double-sided adhesive film for bonding heterogeneous substrates, which has a structure including two types of adhesive layers having different surface characteristics from each other and which can bond two types of adherends having different surface characteristics from each other with high fixing force, a laminated film, and a display device.

BACKGROUND ART

In modern society, with the rapid development of electronic appliances including computers, mobile phones, TVs, monitors, etc., the trend of miniaturization, thinning, and portability is intensifying. Recently, demand for smartphones, tablet PCs, and the like has been rapidly increasing.

In the case of display devices used for such electronic appliances, a traditional flat panel display device has recently developed into a flexible display device that is excellent in design, thin, and light, and has low energy consumption and thin paper-like shape.

Typically, such a display device is formed to have a multi-layered structure of functional substrates or film-type substrates having a specific function. For example, a glass, a protective film or a shock absorbing film for protecting a display device; a light emitting element; a metal substrate with a deposited circuit line; an optical film such as a polarizing plate, a phase retardation plate and a brightness enhancement film; an outermost metal case, or a flexible film used for a future flexible display may be used.

In order to laminate a large number of substrates, it is required to bond substrates to each other using an adhesive film having high adhesive force to each substrate. In this case, the adhesive force of the adhesive film to each substrate varies depending on the material properties of the substrate itself, the material properties of the adhesive film itself, and the state of the surfaces where the two materials are bonded.

Therefore, even in the case of the same adhesive film, this adhesive film is inevitable to have different adhesion characteristics for two substrates having different material characteristics and different surface states. Extremely, when one type of adhesive film is used to laminate two substrates having opposite material properties and opposite surface conditions, a phenomenon in which the adhesive film exhibits high adhesive force to any one substrate but does not exhibit adhesive force to the other substrate at all occurs, so that peeling may occur in the display structure, or originally intended effects of functional substrates may not be exhibited.

Meanwhile, in the case of a flexible display device, not a conventional flat panel display device, additional properties are required, as well as optical properties, durability and adhesive force required in the conventional flat panel display device, depending on the properties of the functional substrate or adhesive film used.

Specifically, in the case of an adhesive film used in a flat panel display device, there is little deformation by external force, but in the case of an adhesive film used in a flexible display device, in use, stress is generated by external bending. In this case, there occur problems that the deformation of the adhesive film into a curved shape by viscoelasticity of an adhesive itself is difficult and stress is transferred to the display device or interlayer peeling occurs in the structure. Thus, there occurs a problem that normal operation of a flexible display device is inhibited.

In order to solve the above problems, Korean Patent Publication No. 10-2017-0097856 (hereinafter, referred to as 'patent document 1') discloses an acrylic adhesive composition that is excellent in bending reliability due to a small change in loss modulus over a wide temperature range by introducing two or more kinds of different cross-linking agents together with an acrylic polymer. However, when such a single-layer adhesive is applied as an interlayer adhesive material, as described above, it is difficult to simultaneously secure high adhesive force to a plurality of substrates having different material characteristics and surface states.

Further, as in Patent Document 1, when an adhesive film having a constant surface state is used as an interlayer adhesive material of a flexible display device, adhesive force at the interface where the shape is deformed is the same as adhesive force at the interface where the shape is not deformed, so that there occurs a problem that stress is selectively applied to the interface where the shape is deformed and this stress is not relieved. In this way, stress generated intensively in the selected area accumulates and becomes a factor causing physical deformation of the entire structure.

Meanwhile, U.S. Pat. No. 8,804,324 (hereinafter, referred to as 'patent document 2') discloses a method of assembling a flexible display device by listing the structures of various types of flexible display devices, particularly, various foldable display devices.

Even in Patent Document 2, a method to solve a stress relaxation method in the flexible portion or folding portion of the flexible display device from a structural point of view has been proposed. However, even when a method of distributing stress in terms of structural design is presented, the permanent deformation of a substrate cannot be avoided when stress accumulates in a bonding member used inside the flexible display device. Therefore, it is necessary to design the bonding member inside the display device in a form capable of distributing stress according to the deformation pattern of the substrate.

CITED REFERENCES

Patent Document (Patent Document 1) Korean Patent Publication No. 10-2017-0097856
(Patent Document 2) U.S. Pat. No. 8,804,324

DESCRIPTION OF EMBODIMENTS

Technical Problem

An embodiment of the present disclosure provides a double-sided adhesive film for bonding heterogeneous substrates, which has a structure including two types of adhesive layers having different surface characteristics from each other and which can bond two types of adherends having different surface characteristics from each other with high fixing force.

Another embodiment of the present disclosure provides a laminated film including the double-sided adhesive film for bonding heterogeneous substrates.

Another embodiment of the present disclosure provides a display device including the double-sided adhesive film for bonding heterogeneous substrates or the laminated film.

Solution to Problem

According to an aspect of the present disclosure, a double-sided adhesive film for bonding heterogeneous substrates includes:

a first adhesive layer; and a second adhesive layer disposed on the first adhesive layer and having adhesive force different from that of the first adhesive layer to the same substrate, wherein the first adhesive layer has a glass transition temperature of −70° C. or higher and lower than 20° C., the second adhesive layer has a surface in which 1% or more and less than 80% of a total surface area is a low surface energy region, and a residual surface area is a high surface energy region, and a difference in surface energy between the two areas satisfies Equation 1 below:

$$5 \text{ mN/m} < E2 - E1 \qquad \text{[Equation 1]}$$

E1: surface energy of the low surface energy region, and

E2: surface energy of the high surface energy region.

The first adhesive layer may include an acrylic adhesive, a silicone-based adhesive, a urethane-based adhesive, a rubber-based adhesive resin, or a combination thereof.

In the second adhesive layer, the low surface energy region may be formed by using at least one of an energy ray curing method, a thermal curing method, a double coating method, and a surface treatment method.

In the second adhesive layer, the low surface energy region may have a storage modulus of 1 MPa or more and less than 10 MPa at 25° C., and the high surface energy region may have a storage modulus of 1 kPa or more and less than 200 kPa at 25° C.

Before and after evaluation of dynamic flexibility of the double-sided adhesive film, in the second adhesive layer, a rate of change of storage modulus of the low surface energy region at 25° C. may be less than 20%, and a rate of change of storage modulus of the high surface energy region at 25° C. may be less than 10%.

In the second adhesive layer, a difference between adhesive force of the low surface energy region and adhesive force of the high surface energy region to the same substrate satisfies Equation 2 below:

$$300 \text{ gf/in} < A2 - A1 \qquad \text{[Equation 2]}$$

A1: adhesive force of the low surface energy region to the substrate, and

A2: adhesive force of the high surface energy region to the substrate.

In the second adhesive layer, the adhesive force (A1) of the low surface energy region to the substrate may be less than 50 gf/in.

In the second adhesive layer, the low surface energy region may be disposed to penetrate the high surface energy region in a thickness direction.

In the second adhesive layer, the low surface energy region may be distributed inside the high surface energy region in the form of one or more islands.

A total thickness of the double-sided adhesive film may be 1 μm or more and less than 100 μm (e.g., 1 μm or more and less than 50 μm), and a ratio of a thickness of the second adhesive layer to a thickness of the first adhesive layer may be 1% or more and less than 150%.

The double-sided adhesive film may further include a base film disposed between the first adhesive layer and the second adhesive layer.

According to another aspect of the present disclosure, A laminated film includes the double-sided adhesive film. According to another aspect of the present disclosure, A display device includes the double-sided adhesive film. The display device may be a flexible display device.

Advantageous Effects of Disclosure

Since the double-sided adhesive film for bonding heterogeneous substrates according to an embodiment of the present disclosure includes two types of adhesive layers having different surface characteristics from each other, this double-sided adhesive film may simultaneously secure excellent adhesive forceve force to various substrates to be bonded on both sides, unlike a conventional adhesive layer formed as a single layer.

Further, in the double-sided adhesive film for bonding heterogeneous substrates, any one adhesive layer includes two areas having different surface energy, so that in a flexible display device, adhesive force and wettability of a shape-deformable driving portion may be selectively reduced, and thus intentional dynamic interfacial peeling may be induced to prevent the occurrence of physical deformation caused by accumulation of stress in the flexible display device.

However, effects of the present disclosure are not limited to the effects mentioned above, and other effects not mentioned will be clearly understood by those skilled in the art from the following description.

MODE OF DISCLOSURE

Figure 1:
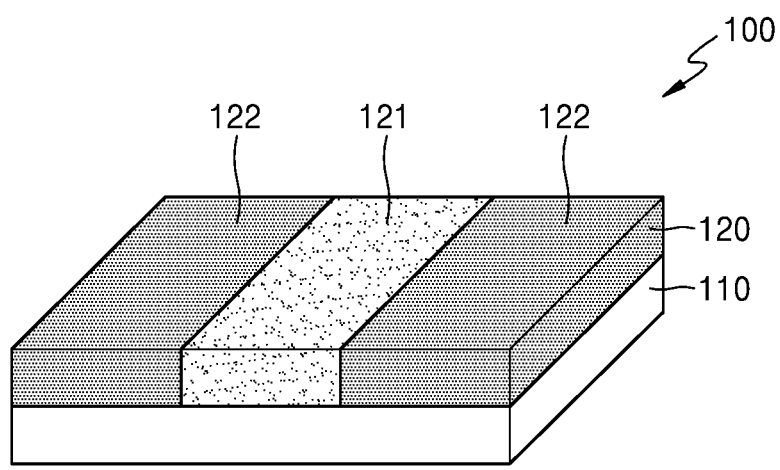
FIGS. 1 to 4 are schematic views of double-sided adhesive films for bonding heterogeneous substrates according to some embodiments of the present disclosure.

Hereinafter, the present disclosure will be described in detail with reference to embodiments of the present disclosure and the attached drawings.

Unless defined otherwise, all technical and scientific terms used herein have the same meanings as those commonly understood by those skilled in the art. In case of conflict, the present specification, including definitions, will be prior to others.

Although methods and materials similar or equivalent to those described herein may be used in the practice or testing of the present disclosure, suitable methods and materials are described herein.

Unless stated otherwise, all percentages, parts, ratios, and the like are based on weight. Further, when an amount, concentration, or other value or parameter is given in one of a range, a preferred range, and a list of preferred upper and lower limits, this should be understood to specifically disclose all ranges formed from any pair of any upper range limit or desired value and any lower range limit or desired value, regardless of whether the ranges are disclosed separately. When a range of numerical values is mentioned herein, unless stated otherwise, the range is intended to include endpoints and all integers and fractions within the range. It is intended that the scope of the present disclosure not be limited to the specific values mentioned when defining a range.

When the term "about" is used to describe the end point of a value or range, it should be understood that the present disclosure includes the specific values or endpoints mentioned.

A double-sided adhesive film for bonding heterogeneous substrates according to an embodiment of the present disclosure include a first adhesive layer and a second adhesive layer disposed on the first adhesive layer.

Adhesive force of the second adhesive layer to the same substrate is different from adhesive force of the first adhesive layer to the same substrate.

Hereinafter, each adhesive layer constituting the double-sided adhesive film for bonding heterogeneous substrates will be described in detail.

<First Adhesive Layer>

The first adhesive layer may have a glass transition temperature of −70° C. or more and less than 20° C., −60° C. or more and less than 20° C., or −50° C. or more and less than 20° C. to obtain suitable initial adhesive force after thermal curing.

When the glass transition temperature of the first adhesive layer is less than −70° C., the molecular weight of an adhesive resin constituting the first adhesive layer is low and thus heat resistance is low. Therefore, there is a problem of deteriorating high-temperature reliability (e.g., generation of outgas in a high-temperature process), and there is a possibility of causing the physical deformation of a structure itself due to excessively high fluidity at driving temperature.

In contrast, when the glass transition temperature of the first adhesive layer is 20° C. or higher, initial adhesive force is low, so that the wettability to the substrate is not sufficiently secured, and thus there is a possibility that interlayer peeling occurs within the structure.

The first adhesive layer may include an acrylic adhesive, a silicone-based adhesive, a urethane-based adhesive, a rubber-based adhesive resin, or a combination thereof.

The acrylic adhesive may include an acrylic copolymer.

The acrylic copolymer may be prepared by copolymerizing 85 wt % to 99 wt % of a monomer not having a crosslinkable functional group and 1 wt % to 15 wt % of a monomer having a crosslinkable functional group based on the total weight of the monomers used in the preparation thereof.

When the content of the monomer not having a crosslinkable functional group is within the above range (85 wt % to 99 wt %) based on the total weight of the monomers used in the preparation thereof, storage stability of a composition for preparing the acrylic copolymer, castability of a composition for forming an adhesive film, and flexibility of an adhesive film are excellent, and reactivity of the crosslinkable functional group is still high, so that a reaction is well performed, and thus degree of crosslinking of the acrylic copolymer may increase to improve cohesion.

The acrylic copolymer may have a weight average molecular weight of 100,000 to 500,000. When the weight average molecular weight of the acrylic copolymer is within the above range, both a problem of flexibility of an adhesive film being deteriorated due to cohesive failure and a problem of workability being deteriorated due to an increase in viscosity may be prevented.

The monomer not having a crosslinkable functional group may be a (meth)acrylic acid ester monomer, but is not limited thereto. For example, the monomer not having a crosslinkable functional group may be a (meth)acrylic acid ester having 1 to 10 carbon atoms in the alkyl group of the ester moiety thereof. Here, the (meth)acrylic acid ester having 1 to 10 carbon atoms in the alkyl group of the ester moiety thereof may include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth) acrylate, decyl (meth)acrylate, dodecyl (meth)acrylate, myristyl (meth)acrylate, palmityl (meth)acrylate, stearyl (meth)acrylate, or a combination thereof.

In the monomer having a crosslinkable functional group, the crosslinkable functional group may include at least one of a hydroxyl group, a carboxyl group, an amino group, and an amide group.

The monomer having a crosslinkable functional group may include (meth)acrylic acid hydroxyalkyl esters such as 2-hydroxyethyl (meth)acrylic acid, 2-hydroxypropyl (meth) acrylic acid, 3-hydroxypropyl (meth)acrylic acid, 2-hydroxybutyl (meth)acrylic acid, 3-hydroxybutyl (meth) acrylic acid, and 4-hydroxybutyl (meth)acrylic acid; acrylic amides such as (meth)acrylamide, N-methyl(meth)acrylamide, and N-methylol(meth)acrylamide; (meth)acrylic acid monomethyl amino ethyl, and (meth)acrylic acid monoalkyl amino ester; ethylenic unsaturated carboxylic acids such as acrylic acid, methacrylic acid, crotonic acid, maleic acid, itaconic acid, and citraconic acid; or a combination thereof.

The silicone-based adhesive may include a silicone polymer, a silicone-based resin, a curing agent, a curing catalyst, or a combination thereof.

The silicone polymer may be an organopolysiloxane including dimethyl siloxane as a main constituent unit. The organopolysiloxane may include at least one functional group selected from a hydroxyl group (—OH), a vinyl group (-vinyl), and a phenyl group (-phenyl).

The silicone-based resin may be organopolysiloxane having at least one unit selected from M unit ($R_3Si_{1/2}$), Q unit ($SiO_2$), T unit ($RSiO_{3/2}$), and D unit ($R_2SiO$). The organopolysiloxane may include at least one functional group selected from a methyl group (—CH$_3$), a vinyl group (-vinyl), and a hydroxyl group (—OH). In particular, the organopolysiloxane may be an MQ resin composed of M unit and Q unit.

The curing agent may include a siloxane-based curing agent having a SiH group. The siloxane-based curing agent may include a polyorgano hydrogen siloxane having an average of two hydrogen atoms bonded to a silicon atom in the molecule. As the organic group bound to the silicon atom, an alkyl group, a phenyl group, a halogenated alkyl group and/or a methyl group may be used.

The content of the curing agent may be 0.1 parts by weight to 30 parts by weight or 0.5 parts by weight to 20 parts by weight based on 100 parts by weight of the total content of the silicone polymer and the silicone-based resin. When the content of the curing agent is within the above range (that is, 0.1 parts by weight to 30 parts by weight), crosslinking easily proceeds, and overcuring does not occur, thereby ensuring flexibility of the adhesive film.

The curing catalyst serves to cause addition reaction type curing.

The curing catalyst may include a precious metal catalyst such as a platinum catalyst or a rhodium catalyst.

The rhodium catalyst is not suitable for a temperature-sensitive substrate because it has a slower curing rate and promotes curing at high temperature.

The content of the curing catalyst may be 0.01 parts by weight to 5 parts by weight based on 100 parts by weight of the total content of the silicone polymer and the silicone-based resin. When the content of the curing catalyst is within the above range, curing proceeds smoothly, and curing speed is also fast.

The urethane-based adhesive may include a urethane resin obtained by curing a composition containing a polyol and a polyfunctional isocyanate as a main component.

The polyol component contained in the urethane-based adhesive may exhibit excellent reworkability characteristics such as reduction of residues.

The polyol may be one kind or two or more kinds.

When the polyol is two or more kinds, one kind thereof may be a polyol having three or more OH groups. Such polyols may include a polyester polyol, a polyether polyol, a polycaprolactone polyol, a polycarbonate polyol, a castor oil-based polyol, or a combination thereof.

The polyester polyol can be obtained by an esterification reaction between a polyol component and an acid component. Such a polyester polyol may include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, polypropylene glycol, or a combination thereof.

The polyether polyol may be prepared by addition polymerization of at least one alkylene oxide selected from ethylene oxide, propylene oxide, and butylene oxide using water, a low molecular weight polyol (propylene glycol, ethylene glycol, glycerin, trimethylolpropane, pentaerythritol, or the like), bisphenols (such as bisphenol A) and/or dihydroxybenzene (catechol, resorcin, hydroquinone, or the like) as an initiator. For example, the polyether polyol may include polyethylene glycol, polypropylene glycol, polytetramethylene glycol, or a combination thereof.

The polycaprolactone polyol may include a caprolactone-based polyester diol obtained by ring-opening polymerization of cyclic ester monomers such as ε-caprolactone or σ-valerolactone. The polycarbonate polyol may include a polycarbonate polyol obtained by polycondensation reaction of the polyol component with phosgene; a polycarbonate polyol obtained by transesterification and condensation of the polyol component and carbonic diesters such dimethyl carbonate, diethyl carbonate, dipropyl carbonate, diisopropyl carbonate, dibutyl carbonate, ethylbutyl carbonate, ethylene carbonate, propylene carbonate, diphenyl carbonate, or dibenzyl carbonate; a copolymerized polycarbonate polyol obtained by using two or more of the above polyol components in combination; a polycarbonate polyol obtained by the esterification reaction of the various polycarbonate polyols with a carboxyl group-containing compound; a polycarbonate polyol obtained by the esterification reaction of the various polycarbonate polyols with a hydroxyl group-containing compound; a polycarbonate polyol obtained by the transesterification reaction of the various polycarbonate polyols and an ester compound; a polycarbonate polyol obtained by the transesterification reaction of the various polycarbonate polyols with a hydroxyl group-containing compound; a polyester-based polycarbonate polyol obtained by the polycondensation reaction of the various polycarbonate polyols with a dicarboxylic acid compound; a copolymerized polyether-based polycarbonate polyol obtained by copolymerizing the various polycarbonate polyols and alkylene oxide; or a combination thereof.

The castor oil-based polyol may include a castor oil-based polyol obtained by reacting a castor oil fatty acid with the polyol component.

The polyol component may contain 1 wt % to 99 wt % or 10 wt % to 90 wt % of a polyol having three or more OH groups among two or more kinds of polyol components. The content of the polyol having three or more OH groups are determined in consideration of adhesive properties such as reworkability and transparency. When the content thereof is within the above range (that is, 1 wt % to 99 wt %), transparency and redetachability of an adhesive may be improved.

As another component for preparing the urethane resin, the polyfunctional isocyanate compound may include a polyfunctional aliphatic isocyanate compound, a polyfunctional alicyclic isocyanate compound, a polyfunctional aromatic diisocyanate compound, a trimer having an isocyanurate ring, or a combination thereof.

The polyfunctional aliphatic isocyanate compound may include trimethylene diisocyanate, tetramethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, or a combination thereof.

The polyfunctional alicyclic isocyanate compound may include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, or a combination thereof.

The polyfunctional aromatic diisocyanate compound may include phenylene diisocyanate, 2,4-tolylene diisocyanate, 2,6-tolylene diisocyanate, 2,2'-diphenylmethane diisocyanate, 4,4'-diphenyl Methane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, or a combination thereof.

The polyfunctional isocyanate compound may include trimethylolpropane adducts of various polyfunctional isocyanate compounds described above, a biuret obtained by reacting with water, a trimer having an isocyanurate ring, or a combination thereof.

As described above, the urethane resin may be obtained by curing a composition containing a polyol and a polyfunctional isocyanate compound.

The rubber-based adhesive resin may have a weight average molecular weight of 30,000 to 2,000,000. When the weight average molecular weight of the rubber-based adhesive resin is within the above range, cohesive failure does not occur and thus flexibility of the sheet (that is, the double-sided adhesive film for bonding heterogeneous substrates) does not deteriorate, and viscosity is appropriate and thus workability is good.

Further, the rubber-based adhesive resin may include a first rubber-based adhesive resin having a relatively lower weight average molecular weight and a second rubber-based adhesive resin having a relatively higher weight average molecular weight. As described above, two or more kinds of rubber-based adhesive resins having different weight average molecular weights may be appropriately mixed, thereby improving an adhesion function, heat resistance, thermal aging resistance, ozone resistance and chemical resistance and increasing weather resistance. The preferable mixing ratio may be changed according to the user's choice, the first rubber-based adhesive resin having a weight average molecular weight of about 50,000 and the second rubber-based adhesive resin having a weight average molecular weight of about 1,200,000 may be mixed at a weight ratio of 1:9 to 9:1, preferably 7:3 to 3:7, thereby obtaining desired physical properties.

Furthermore, the rubber-based adhesive resin may not include silicone rubber. As used herein, "silicone rubber", which is an elastomer made of silicone, as a polymer itself, refers to a rubber-like material containing silicon (Si) together with carbon, hydrogen, and oxygen.

The rubber-based adhesive resin may include styrene-butadiene-styrene rubber (SBSR), styrene-butadiene rubber (SBR), styrene-isoprene-styrene rubber (SISR), styrene-ethylene-butylene-styrene rubber (SEBSR), natural rubber (NR), ethylene-propylene-diene rubber (EPDM), ethylene-propylene rubber (EPM), polyacrylate rubber (ACM), butadiene rubber (BR), nitrile-butadiene rubber (NBR), hydrogen-substituted nitrile rubber (HNBR), chloroprene rubber (CR), chlorosulfonated polyethylene rubber (CSM), fluorocarbon rubber (FPM), ethylene-acrylate rubber (AEM), epichlorohydrin rubber (ECO), isoprene rubber (IR), polyisobutylene rubber (PIB), isoprene-isobutylene rubber (IIR), or a combination thereof. However, the present invention is not limited thereto. Any adhesive may be used in the first adhesive layer as long as it includes a rubber-based adhesive resin and satisfies the glass transition temperature range (that is, −70° C. or higher, and lower than 20° C.).

Further, the composition may include an antistatic agent, a catalyst, a resin component other than urethane resin, a tackifier, an inorganic filler, an organic filler, metal powder, a pigment, a softener, a plasticizer, an anti-aging agent, a conducting agent, an antioxidant, a UV absorber, a light stabilizer, a surface lubricant, a leveling agent, a corrosion inhibitor, a heat stabilizer, a polymerization inhibitor, a lubricant, a solvent, or the like in the range that effects of the present disclosure are not impaired, and may further include an anti-degradation agent such as a plasticizer, an antistatic agent, an antioxidant, a UV absorber, or a light stabilizer.

The first adhesive layer may further include an antistatic agent, an tackifier, an inorganic filler, an organic filler, an antioxidant, a softener, a plasticizer, a UV absorber, a light stabilizer, a leveling agent, a corrosion inhibitor, or a combination thereof in the range that effects of the present disclosure are not impaired.

The tackifier is used to provide tackiness to the first adhesive layer, and any tackifier may be used as long as it is commonly used in the art. Preferably, an aliphatic petroleum resin, a rosin modified resin, a terpene resin, rosin, or a mixture thereof may be used as the tackifier, but the present disclosure is not limited thereto.

<Second Adhesive Layer>

The second adhesive layer may have a surface in which 1% or more and less than 80% of a total surface area is a low surface energy region, and a residual surface area is a high surface energy region. When the low surface energy region is less than 1% of the total area of the second adhesive layer, the area of the interface of the substrate attached to the low surface energy region with respect to the total area of the substrate is small, and thus stress caused by the shape deformation of the substrate cannot be sufficiently distributed. Meanwhile, when the low surface energy region is 80% or more of the total area of the second adhesive layer, the high surface energy region exhibiting high adhesive force to the interface of the substrate become excessively small, and thus adhesive force to the substrate deteriorates, so that there is a possibility that a delamination or debonding defect occurs inside the structure.

As used herein, the "surface energy", which is a value quantifying the breakdown of intermolecular bonds occurring when a surface is generated, refers to a value that is calculated by Young-Dupre Equation after measuring the contact angle of a surface to be measured with respect to each of water ($H_2O$) as a hydrophilic solvent and diiodomethane ($CH_2I_2$) as a hydrophobic solvent using Sessile Drop Technique according to ASTM D5946.

The high surface energy region has higher surface energy than the low surface energy region.

The difference between surface energy of the high surface energy region and surface energy of the low surface energy region satisfies Equation 1 below.

$$5 \text{ mN/m} < E2 - E1 \qquad \text{[Equation 1]}$$

E1: surface energy of the low surface energy region, and
E2: surface energy of the high surface energy region.

When the difference between surface energy E1 of the low surface energy region and surface energy E2 of the high surface energy region is 5 mN/m or less, the difference in selective adhesive force and wettability within the single adhesive layer to be achieved by the present disclosure cannot be realized.

For example, when the difference between surface energy E1 of the low surface energy region and surface energy E2 of the high surface energy region is 5 mN/m or less and both the surface energy E1 of the low surface energy region and the surface energy E2 of the high surface energy region are high, it is possible to achieve high adhesive force and wettability to a substrate in the high surface energy region, but even in the low surface energy region attached to a portion where the shape of the substrate is deformed, the adhesive force and wettability to the deformed portion of the substrate are increased, so that stress due to the deformation of the substrate cannot be efficiently distributed. Therefore, it is possible that the entire substrate and structure are affected by stress accumulation, resulting in physical permanent deformation.

As another example, when the difference between surface energy E1 of the low surface energy region and surface energy E2 of the high surface energy region is 5 mN/m or less and both the surface energy E1 of the low surface energy region and the surface energy E2 of the high surface energy region are low, the low surface energy region attached to a portion where the shape of the substrate is deformed is not attached to the deformed portion of the substrate, so that stress generated by the deformation of the substrate can be effectively distributed. However, the adhesive force and wettability of the interface of the substrate attached to the high surface energy region are poor, and thus there is a possibility that a delamination or debonding defect occurs inside the structure.

The second adhesive layer may include an acrylic adhesive, an epoxy adhesive, a vinyl adhesive, a silicone-based adhesive, a fluorine-based adhesive, or a combination thereof.

The acrylic adhesive and the silicone adhesive may be the same as the acrylic adhesive and the silicone adhesive mentioned in the first adhesive layer-related part, respectively.

In the second adhesive layer, the low surface energy region may be formed using at least one of an energy ray curing method, a thermal curing method, a double coating method, and a surface treatment method.

Each of the energy ray curing method and the thermal curing method is a method of controlling an equivalent (equiv.) of polar functional groups present in the adhesive through a chemical reaction. As the representative method thereof, there is a method of removing polar functional groups present in the adhesive through a crosslinking reaction. As the method of causing a crosslinking reaction inside the adhesive, there are a method using heat and a method using ultraviolet rays or electron beams.

First, as an example of the method using heat, there is a method of reducing an equivalent (equiv.) of polar functional groups by causing a local crosslinking reaction by heating only a part of an adhesive layer using a hot plate or hot press having an area smaller than the total area of the adhesive layer including an acrylic adhesive containing an excess polyfunctional isocyanate curing agent or an epoxy adhesive containing an excess polyfunctional amine curing agent.

Next, as an example of the method using ultraviolet rays or electron beams, there is a method of controlling surface energy of only a part of an adhesive layer by reducing an equivalent (equiv.) of polar functional groups inside the adhesive layer by forming the adhesive layer using an acrylic and/or vinyl-based adhesive capable of causing a crosslinking reaction by radicals and then irradiating only a part of the adhesive layer with ultraviolet rays or electron beams using a photomask or the like to cause a crosslinking reaction inside the adhesive layer.

The double coating method is a method of coating a base film with a plurality of adhesives having different surface energy.

First, in order to form two regions having different surface energy in an adhesive layer, there is a method of applying a plurality of adhesives having a large difference in surface energy therebetween onto a base film. Generally, in the case of an adhesive having low surface energy, it may have a hydrophobic functional group or a hydrophobic additive in the structure of a polymer constituting the adhesive. Typical examples of the adhesive having low surface energy may include a silicone-based adhesive having a siloxane structure in the basic skeleton of a polymer, a fluorine-based adhesive having a perfluoro structure, and an adhesive to which a silicone-based additive or a fluorine-based additive is added. In contrast, as an adhesive having high surface energy, an acrylic resin or epoxy resin having a hydrophillic functional group in the structure of a polymer constituting the adhesive is a typical example.

As a method for forming an adhesive layer having two regions having different surface energies by applying two adhesives having different surface energies onto a base film, there is a method using one application process, and there is a method of separately applying respective adhesives through several application processes.

As the method for forming an adhesive layer having two regions having different surface energies using one application process, first, there is a method of applying a plurality of adhesives onto a base film using a plurality of separate coating heads. For example, there is a method of forming a plurality of patterns having different surface energy in the driving direction of a base film by injecting a plurality of adhesives having different surface energies one by one into a plurality of nozzles of a slot die coater. In addition, there is a method of forming a plurality of patterns having different surface energies in the driving direction of dividing a liquid pan of a comma coater into a plurality of liquid pans and filling the liquid pans with a plurality of adhesives having different surface energies one by one. In addition, there is a method of forming an adhesive layer provided with predetermined patterns having different surface energies using properties of two kinds of adhesives (i.e., each adhesive is agglomerated and two kinds of adhesives are not mixed with each other) by mixing the two kinds of adhesives having different surface energies and poor compatibility with each other and then applying the adhesives onto a base film.

As the method of separately applying respective adhesives through several application processes, there are i) a screen printing method in which any one kind of adhesive (first adhesive) is applied onto a base film according to a predetermined pattern, and then an adhesive having different surface energy (second adhesive) is applied onto a residual region using a screen having a pattern opposite to the above pattern, or ii) a comma coating method in which any one kind of adhesive (first adhesive) is applied onto a base film according to a predetermined pattern, and the second adhesive is applied in accordance with the thickness of the previously applied first adhesive.

The surface treatment method is a method of performing surface treatment on a part of the surface of an adhesive layer.

As the surface treatment method, there is a method of decreasing the surface energy of only a part of a surface of an adhesive layer by applying a material having a siloxane structure or a perfluoro structure and having low surface energy onto a part of the adhesive layer, or a method of increasing the surface energy of a portion other than the masked portion by masking a part of an adhesive layer and performing plasma or corona treatment on a residual part thereof.

In the present disclosure, the method for forming two regions having different surface energies is not limited to the above-described methods, and various methods may be used to achieve an object of the present disclosure.

In the second adhesive layer, the low surface energy region may have a storage modulus of 1 MPa or more and less than 10 MPa at 25° C., and the high surface energy region may have a storage modulus of 1 kPa or more and less than 200 kPa at 25° C.

First, when the storage modulus of the low surface energy region at 25° C. in the second adhesive layer is within the above range, (i) wettability to a substrate is lowered, and thus selective partial peeling occurs when the shape of the substrate is changed, so that stress can be distributed, and thus physical permanent deformation of the entire structure or display does not occur, (ii) the second adhesive layer itself has low brittleness, so that the second adhesive layer can endure the stress occurring when the shape of a structure or a display is deformed, and thus a problem of selectively breaking the low surface energy region in the second adhesive layer does not occur, and (iii) the second adhesive layer itself does not have high hardness, so that the permanent physical deformation of the second adhesive layer itself is not caused even by the repetitive deformation of the substrate, and thus no deformation occurs in the entire structure layered on the substrate. If the low surface energy region inside the second adhesive layer is broken, fragments of the low surface energy region detached from the second adhesive layer brings an imbalance of the thickness of the second adhesive layer, and the imbalanced portion is transferred to a display device to cause visible appearance failure, and there is a possibility of causing interlayer peeling or delamination inside the structure depending on the degree of visible appearance failure.

Next, when the storage modulus of the high surface energy region at 25° C. in the second adhesive layer is within the above range, (i) an adhesive film having a uniform thickness may be formed because the fluidity of the adhesive layer itself is not high, (ii) the adhesive layer does not flow out of the structure according to the process of use after attachment, so that constant adhesive force to the substrate can be realized, and (iii) high adhesive force and wettability to the substrate can be ensured to prevent interlay peeling or delamination.

In the second adhesive layer, the storage modulus of the low surface energy region at 25° C. may be 10 times or more and less than 1000 times or 50 times or more and less than 500 times of the storage modulus of the high surface energy region at 25° C.

Meanwhile, evaluation of dynamic flexibility may be performed by attaching the both sides of the double-sided adhesive film for bonding heterogeneous substrates onto two flexible substrates.

Before and after evaluation of dynamic flexibility of the double-sided adhesive film, in the second adhesive layer, a rate of change of storage modulus of the low surface energy region at 25° C. may be less than 20%, and a rate of change of storage modulus of the high surface energy region at 25° C. may be less than 10%.

As used herein, before and after evaluation of dynamic flexibility of the double-sided adhesive film for bonding heterogeneous substrates, the rate of change of storage modulus refers to an absolute value of the value calculated according to Equation 3.

$$\text{Rate of change of storage modulus (\%)} = (\text{storage modulus after dynamic flexibility evaluation} - \text{storage modulus before dynamic flexibility evaluation})/\text{storage modulus before dynamic flexibility evaluation} \times 100 \quad \text{[Equation 3]}$$

Before and after evaluation of dynamic flexibility of the double-sided adhesive film, in the second adhesive layer, when the rate of change of storage modulus of the low surface energy region at 25° C. is less than 20%, (i) when the shape of a substrate to be attached is repeatedly deformed, the shape of the second adhesive layer is restored in its original state even if the shape of the second adhesive layer is physically deformed according to the deformed shape of the substrate, so that permanent deformation does not occur, (ii) since any part of the second adhesive layer is not permanently deformed due to external force, deformation of the shape is not transferred up to the outer surface of a display device, and interlayer peeling or delamination does not occur, and (iii) the second adhesive layer itself has low brittleness, so that the second adhesive layer can endure the stress occurring when the shape of a structure or a display is deformed, and thus a problem of selectively breaking the low surface energy region in the second adhesive layer does not occur. If the low surface energy region inside the second adhesive layer is broken, fragments of the low surface energy region detached from the second adhesive layer brings an imbalance of the thickness of the second adhesive layer, and the imbalanced portion is transferred to a display device to cause visible appearance failure, and there is a possibility of causing interlayer peeling or delamination inside the structure depending on the degree of visible appearance failure.

Further, before and after evaluation of dynamic flexibility of the double-sided adhesive film, in the second adhesive layer, when the rate of change of storage modulus of the high surface energy region at 25° C. is less than 10%, since adhesive force and wettability to a substrate are maintained constant, even when the shape of the substrate is repeatedly deformed, peeling or delamination does not occur even in the high surface energy region around the interface closest to the low surface energy region, and thus interlayer peeling or delamination inside the structure does not occur.

Further, in the second adhesive layer, the difference between adhesive force of the low surface energy region and adhesive force of the high surface energy region to the same substrate may satisfy Equation 2 below:

$$300 \text{ gf/in(gram-force per inch)} < A2 - A1 \quad \text{[Equation 2]}$$

A1: adhesive force of low surface energy region to substrate, and

A2: adhesive force of high surface energy region to substrate.

When the difference between adhesive force of the low surface energy region and adhesive force of the high surface energy region to the same substrate is within the above range, (i) it is possible to realize a difference in selective adhesive force and wettability to the substrate inside a single adhesive layer to be achieved by the present disclosure. Therefore, (ii) adhesive force of the low surface energy region to the substrate is low, and thus it is possible to sufficiently relieve the stress caused by the deformation of the substrate, and (iii) adhesive force of the high surface energy region to the substrate is high, and thus it is possible to well fix the layers without interlayer peeling or delamination in the interface.

In the second adhesive layer, regardless of the kind of substrate, the adhesive force (A1) of the low surface energy region to the substrate may be less than 50 gf/in, 1 gf/in or more and less than 50 gf/in, 1 gf/in or more and less than 20 gf/in, or 1 gf/in or more and less than 10 gf/in. For this purpose, any one of a plurality of substrates having different surface characteristics is selected, and then adhesion characteristics of the low surface energy region are adjusted to adjust the adhesive force (A1) of the low surface energy region to the substrate in the second adhesive layer to less than 50 gf/in, 1 gf/in or more and less than 50 gf/in, 1 gf/in or more and 20 gf/in or less, or 1 gf/in or more and less than 10 gf/in.

In the second adhesive layer, the low surface energy region may be disposed to penetrate the high surface energy region in a thickness direction.

As used herein, the "thickness direction" refers to a direction perpendicular to a surface having the maximum area in the high surface energy region.

Further, as used herein, the "inside" refers to an inner side of a closed curve formed by connecting the edges of a surface having the maximum area in the high surface energy region.

For example, in the second adhesive layer, the low surface energy region may exist inside the high surface energy region in the form of one island, or may exist to be distributed in the form of two or more islands.

The planar shape of the low surface energy region surrounded by the high surface energy region is not particularly limited, and may be a circle, an ellipse, a triangle, a rectangle, a pentagon, a hexagon, or a combination thereof.

<Double-Sided Adhesive Film for Bonding Heterogeneous Substrates>

The double-sided adhesive film for bonding heterogeneous substrates according to an embodiment of the present disclosure may be produced by laminating a first adhesive layer and a second adhesive layer.

As an example of the method of producing the double-sided adhesive film for bonding heterogeneous substrates, there may be exemplified a method in which a first adhesive and a second adhesive are respectively applied onto release-treated base films and dried to form two adhesive films, and then the two adhesive films are in contact with each other and bonded to each other.

As another example thereof, there may be used a method of producing the double-sided adhesive film for bonding heterogeneous substrates in which a first adhesive is applied onto a base film and dried to form a first adhesive layer, a second adhesive is applied onto a release-treated base film and dried to form a second adhesive layer, and the second adhesive layer is bonded to the back surface of the base film provided thereon with the first adhesive layer to provide the base film between the first adhesive layer and the second adhesive layer.

As another example thereof, there may also be used a method of forming an adhesive film having a two-layer structure by applying a first adhesive onto a release-treated base film and drying the first adhesive to form a first adhesive layer and then applying a second adhesive onto the first adhesive layer and drying the second adhesive to form a second adhesive layer.

In addition to the above-described methods, any method may be used as long as it is a method of manufacturing a double-sided adhesive film for bonding heterogeneous substrates to achieve the purpose of the present disclosure.

The total thickness of the double-sided adhesive film for bonding heterogeneous substrates may be 1 μm or more and less than 100 μm (for example, 1 μm or more and less than 50 μm), and the ratio of thickness of the second adhesive layer to thickness of the first adhesive layer may be 1% or more and less than 150%.

When the total thickness of the double-sided adhesive film for bonding heterogeneous substrates is within the above range, (i) it is easy to secure uniformity of thickness in the process of manufacturing the double-sided adhesive film for bonding heterogeneous substrates, (ii) good workability can be ensured in the process of peeling a release film from the double-sided adhesive film or attaching the double-sided adhesive film to the substrate, and (iii) in the structure of a flexible display device, stress due to the deformation of the substrate increases in proportion to the cube of thickness, but the thickness of the entire laminated structure is maintained at a level that great stress is not applied in the structure to prevent the physical deformation of the structure itself.

Further, when the ratio of thickness of the second adhesive layer to thickness of the first adhesive layer is within the above range, (i) since the thickness of the second adhesive layer is not too thin, poor workability is not caused in the process, (ii) since the thickness of the high surface energy region inside the second adhesive layer is not too thin, sufficient adhesive force to the interface of the substrate can be secured, and (iii) since the ratio of the thickness occupied by the low surface energy region inside the second adhesive layer to the total thickness of the double-sided adhesive film for bonding heterogeneous substrates is not too high, the storage modulus of the entire double-sided adhesive film for bonding heterogeneous substrates is not too high, so that when the deformation of the shape of the substrate occurs, a problem that the shape of the double-sided adhesive film for bonding heterogeneous substrates is physically permanently deformed does not occur.

The double-sided adhesive film for bonding heterogeneous substrates may further include a base film disposed between the first adhesive layer and the second adhesive layer.

FIGS. 1 to 4 are schematic views of double-sided adhesive films for bonding heterogeneous substrates according to some embodiments of the present disclosure.

Referring to FIG. 1, a double-sided adhesive film 100 for bonding heterogeneous substrates includes a first adhesive layer 110 and a second adhesive layer 120 disposed thereon. The second adhesive layer 120 includes a low surface energy region 121 and a high surface energy region 122, and the low surface energy region 121 is disposed to penetrate the high surface energy region 122 in a thickness direction. Specifically, the rectangular parallelepiped-shaped low surface energy region 121 is closely disposed between the two rectangular parallelepiped-shaped high surface energy regions 122.

Figure 2:
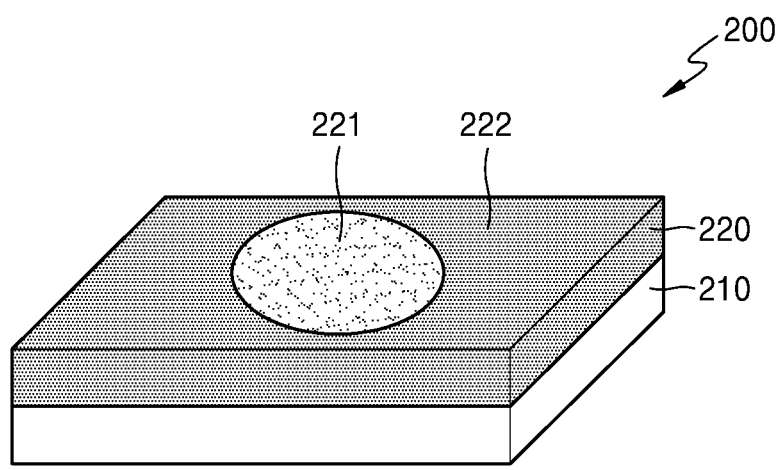

Referring to FIG. 2, a double-sided adhesive film 200 for bonding heterogeneous substrates includes a first adhesive layer 210 and a second adhesive layer 220 disposed thereon. The second adhesive layer 220 includes a low surface energy region 221 and a high surface energy region 222, and the low surface energy region 221 is disposed to penetrate the high surface energy region 222 in the thickness direction to have one island shape therein. Specifically, the cylindrical low surface energy region 221 may be disposed to penetrate the rectangular parallelepiped-shaped high surface energy region 222 in the thickness direction to have one island shape therein.

Figure 3:
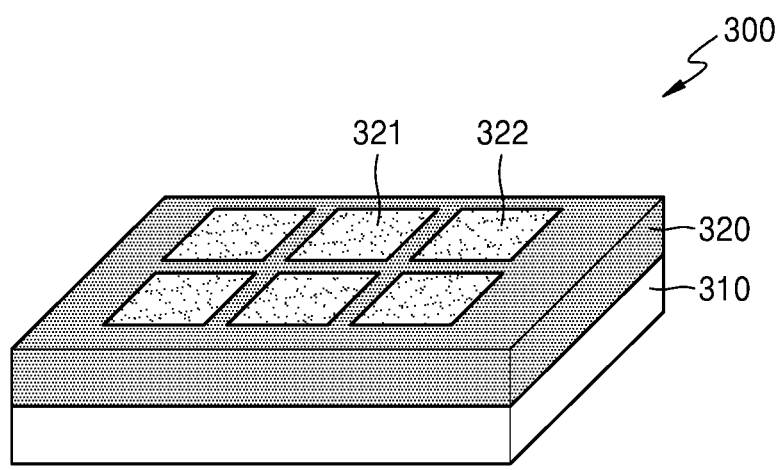

Referring to FIG. 3, a double-sided adhesive film 300 for bonding heterogeneous substrates includes a first adhesive layer 310 and a second adhesive layer 320 disposed thereon. The second adhesive layer 320 includes a low surface energy region 321 and a high surface energy region 322, and the low surface energy region 321 is disposed to penetrate the high surface energy region 322 in the thickness direction to have a plurality of island shapes therein. Specifically, the six rectangular parallelepiped-shaped low surface energy regions 321 may be disposed to penetrate the rectangular parallelepiped-shaped high surface energy region 322 in the thickness direction to have a plurality of island shape therein.

Figure 4:
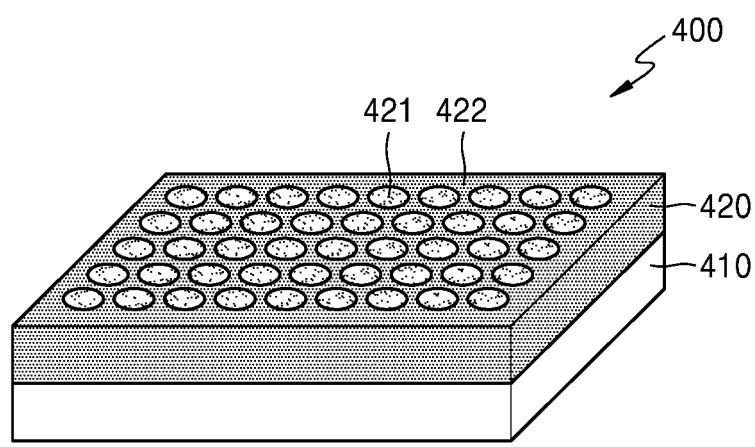

Referring to FIG. 4, a double-sided adhesive film 400 for bonding heterogeneous substrates includes a first adhesive layer 410 and a second adhesive layer 420 disposed thereon. The second adhesive layer 420 includes a low surface energy region 421 and a high surface energy region 422, and the low surface energy region 421 is disposed to penetrate the high surface energy region 422 in the thickness direction to have a plurality of island shapes therein. Specifically, the plurality of cylindrical low surface energy regions 421 may be disposed to penetrate the rectangular parallelepiped-shaped high surface energy region 322 in the thickness direction to have an island shape therein.

<Laminated Film>

A laminated film according to an embodiment of the present disclosure may include the double-sided adhesive film for bonding heterogeneous substrates.

Specifically, the laminated film may include two kinds of adherends having different surface characteristics from each other and the double-sided adhesive film disposed therebetween.

<Display Device>

A display device according to an embodiment of the present disclosure may include the double-sided adhesive film for bonding heterogeneous substrates or the laminated film.

The display device may be a flexible display device.

Hereinafter, the present disclosure will be described in more detail with reference to examples, but the present disclosure is not limited to these examples.

Example 1

50 parts by weight of toluene and 5.3 parts by weight of silicone-based resin (DC7426, manufactured by Dow Corning Corporation) were sequentially introduced into 100 parts by weight of silicone-based resin (DC7663, manufactured by Dow Corning Corporation), and then stirred for 2 hours. Thereafter, 0.5 parts by weight of a platinum catalyst (SYL-OFF 4000 CATALYST, manufactured by Dow Corning Corporation) was added thereto and additionally stirred for 30 minutes to prepare an adhesive composition. The adhesive composition prepared in this way was applied onto a PET film (75 μm, manufactured by Toray Advanced Material Co., Ltd) release-treated with fluorine and then dried to form a first adhesive layer having a thickness of 20 μm.

Meanwhile, 100 parts by weight of ethyl acetate and 1 part by weight of a photoinitiator (IR127, manufactured by BASF Corporation) were sequentially introduced into 100 parts by weight of acrylic resin (UVPSA1800, manufactured by AEKYUNG CHEMICAL Co., Ltd.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. The adhesive composition prepared in this way was applied onto a PET film (75 μm, ROH751, manufactured by Toray Advanced Material Co., Ltd) release-treated with silicone and then dried to form a second adhesive layer having a thickness of 10 μm.

The first adhesive layer and the second adhesive layer were bonded to each other by a roll laminator (PHOTONEX SYNC 325, manufactured by GMP Corporation) such that their adhesion surfaces were in contact with each other, so as to manufacture a double-sided adhesive film for bonding heterogeneous substrates, having a total thickness of 30 μm.

The manufactured double-sided adhesive film was cut to a size of 100 mm×100 mm, and then a photomask made of steel special use stainless (SUS), having a size of 100 mm×100 mm and a thickness of 2 mm and provided at the center thereof with a hole having a size of 30 mm×30 mm was placed on the upper surface of the second adhesive layer. Then, the second adhesive layer was irradiated with UV in a light intensity of 150 mJ/cm$^2$ using a UV irradiator (high-pressure mercury lamp, manufactured by Litzen Corporation) to form a low surface energy region at the center of the second adhesive layer.

Example 2

A double-sided adhesive film for bonding heterogeneous substrates was manufactured in the same manner as in Example 1, except that the UV light intensity was changed to 200 mJ/cm$^2$.

Example 3

A double-sided adhesive film for bonding heterogeneous substrates was manufactured in the same manner as in Example 1, except that the UV light intensity was changed to 300 mJ/cm$^2$.

Example 4

A double-sided adhesive film for bonding heterogeneous substrates was manufactured in the same manner as in Example 1, except that the UV light intensity was changed to 500 mJ/cm$^2$.

Example 5

100 parts by weight of ethyl acetate, 20 parts by weight of an acrylic oligomer (KAYARAD DPCA-20, manufactured by Nippon Kayaku Co., Ltd.) and 1 part by weight of a photoinitiator (IR127, manufactured by BASF Corporation) were sequentially introduced into 100 parts by weight of acrylic resin (UVPSA1800, manufactured by AEKYUNG CHEMICAL Co., Ltd.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 1, except that the adhesive composition prepared in this way was applied onto a PET film (75 μm, ROH751, manufactured by Toray Advanced Material Co., Ltd) release-treated with silicone and then dried to form a second adhesive layer having a thickness of 10 μm (that is, only the method of forming the second adhesive layer was changed).

Example 6

100 parts by weight of ethyl acetate and 1 part by weight of a photoinitiator (IR127, manufactured by BASF Corporation) were sequentially introduced into 100 parts by weight of acrylic resin (UVPSA5016, manufactured by AEKYUNG CHEMICAL Co., Ltd.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 1, except that the adhesive composition prepared in this way was applied onto a PET film (75 μm, ROH751, manufactured by Toray Advanced Material Co., Ltd) release-treated with silicone and then dried to form a second adhesive layer having a thickness of 10 μm (that is, only the method of forming the second adhesive layer was changed).

Example 7

50 parts by weight of toluene and 5.3 parts by weight of silicone-based resin (DC7426, manufactured by Dow Corning Corporation) were sequentially introduced into 100 parts by weight of silicone-based resin (DC7663, manufactured by Dow Corning Corporation), and then stirred for 2 hours. Thereafter, 0.5 parts by weight of a platinum catalyst (SYL-OFF 4000 CATALYST, manufactured by Dow Corning Corporation) was added thereto and additionally stirred for 30 minutes to prepare an adhesive composition. The adhesive composition prepared in this way was applied onto a PET film (75 μm, manufactured by Toray Advanced Material Co., Ltd) release-treated with fluorine and then dried to form a first adhesive layer having a thickness of 20 μm.

Meanwhile, 50 parts by weight of toluene were introduced into 100 parts by weight of silicone-based resin (DC7662, manufactured by Dow Corning Corporation), and stirred for 2 hours. Thereafter, 0.5 parts by weight of a platinum catalyst (SYL-OFF 4000 CATALYST, manufactured by Dow Corning Corporation) was added thereto and additionally stirred for 30 minutes to prepare an adhesive composition. The adhesive composition prepared in this way was applied onto a PET film (75 μm, manufactured by Toray Advanced Material Co., Ltd) release-treated with fluorine by a screen printing method using a 200 mesh screen having a size of 30 mm×30 mm and then dried to form a low surface energy region of a second adhesive layer having a thickness of 10 μm.

100 parts by weight of ethyl acetate were introduced into 100 parts by weight of acrylic resin (SA3000, manufactured by SAMHWA PAINTS INDUSTRIAL CO., LTD.), and then stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. After the low surface energy region of the second adhesive layer was aligned to overlap a masking portion, the adhesive composition prepared in this way was applied onto a PET film (75 μm, manufactured by Toray Advanced Material Co., Ltd) release-treated with fluorine by a screen printing method using a 200 mesh screen having a size of 100 mm×100 mm and including a masked center portion of 30 mm×30 mm and then dried to form a high surface energy region of a second adhesive layer having a thickness of 10 μm outside the low surface energy region.

The first adhesive layer and the second adhesive layer were bonded to each other by a roll laminator (PHOTONEX SYNC 325, manufactured by GMP Corporation) in a state that their adhesion surfaces were in contact with each other, so as to manufacture a double-sided adhesive film for bonding heterogeneous substrates, having a total thickness of 30 μm.

Example 8

100 parts by weight of ethyl acetate were introduced into 100 parts by weight of acrylic resin (HCP1800, manufactured by AEKYUNG CHEMICAL Co., Ltd.), and then stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 7, except that after the low surface energy region of the second adhesive layer according to Example 7 was aligned to overlap a masking portion, the adhesive composition prepared in this way was applied onto a PET film (75 μm, manufactured by Toray Advanced Material Co., Ltd) release-treated with fluorine by a screen printing method using a 200 mesh screen having a size of 100 mm×100 mm and including a masked center portion of 30 mm×30 mm and then dried to form a high surface energy region of a second adhesive layer having a thickness of 10 μm outside the low surface energy region.

Example 9

50 parts by weight of toluene and 5.3 parts by weight of silicone-based resin (DC7426, manufactured by Dow Corning Corporation) were sequentially introduced into 100 parts by weight of silicone-based resin (DC7663, manufactured by Dow Corning Corporation), and then stirred for 2 hours. Thereafter, 0.5 parts by weight of a platinum catalyst (SYL-OFF 4000 CATALYST, manufactured by Dow Corning Corporation) was added thereto and additionally stirred for 30 minutes to prepare an adhesive composition. The adhesive composition prepared in this way was applied onto a PET film (75 μm, manufactured by Toray Advanced Material Co., Ltd) release-treated with fluorine and then dried to form a first adhesive layer having a thickness of 20 μm.

Meanwhile, 100 parts by weight of ethyl acetate, 30 parts by weight of bisphenol A epoxy resin (YD-128, manufactured by KUKDO CHEMICAL CO., LTD.), 15 parts by weight of 3,3'-sulfonyldianiline (manufactured by TCI Corporation), and 0.3 parts by weight of 2-methylimidazole (manufactured by TCI Corporation) were sequentially introduced into 100 parts by weight of acrylic resin (SA3000, manufactured by SAMHWA PAINTS INDUSTRIAL CO., LTD.), and then stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. The adhesive composition prepared in this way was applied onto a PET film (75 μm, ROH751, manufactured by Toray Advanced Material Co., Ltd) release-treated with silicone and then dried to form a second adhesive layer having a thickness of 10 μm.

The first adhesive layer and the second adhesive layer were bonded to each other by a roll laminator (PHOTONEX SYNC 325, manufactured by GMP Corporation) such that their adhesion surfaces were in contact with each other, so as to manufacture a double-sided adhesive film for bonding heterogeneous substrates, having a total thickness of 30 μm.

After the manufactured double-sided adhesive film was cut to a size of 100 mm×100 mm, a SUS having a size of 30 mm×30 mm and a thickness of 5 mm was located over/under the center of the double-sided adhesive film and placed on a hot plate (SH-200, manufactured by Samhyeon Corporation) heated to 130° C. to allow heat to be transferred to only a portion of the double-sided adhesive film contacting the SUS, and the double-sided adhesive film was left for 10 minutes, thereby forming a low surface energy region of the second adhesive layer. In this case, a portion of the double-sided adhesive film not contacting the SUS was floated in the air not to be in contact with the hot plate.

Example 10

A double-sided adhesive film for bonding heterogeneous substrates was manufactured in the same manner as in Example 9, except that the heating time using the hot plate was changed to 20 minutes.

Comparative Example 1

50 parts by weight of toluene was introduced into 100 parts by weight of phenoxy resin (YP50EK35, manufactured by KUKDO CHEMICAL CO., LTD.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 1, except that the adhesive composition prepared in this way was applied onto a PET film (75 μm, ROH751, manufactured by Toray Advanced Material Co., Ltd) release-treated with silicone and then dried to form a first adhesive layer having a thickness of 10 μm (that is, only the method of forming the first adhesive layer was changed).

Comparative Example 2

A double-sided adhesive film for bonding heterogeneous substrates was manufactured in the same manner as in Example 1, except that UV was not irradiated to the second adhesive layer.

Comparative Example 3

A double-sided adhesive film for bonding heterogeneous substrates was manufactured in the same manner as in Example 1, except that the UV light intensity was changed to 500 mJ/cm$^2$.

Comparative Example 4

A double-sided adhesive film for bonding heterogeneous substrates was manufactured in the same manner as in Example 1, except that the UV light intensity was changed to 100 mJ/cm$^2$.

Comparative Example 5

A double-sided adhesive film for bonding heterogeneous substrates was manufactured in the same manner as in Example 1, except that the size of the UV irradiation area was changed to 9 mm×9 mm.

Comparative Example 6

A double-sided adhesive film for bonding heterogeneous substrates was manufactured in the same manner as in Example 1, except that the size of the UV irradiation area was changed to 90 mm×90 mm.

In Examples 1 to 10 and Comparative Examples 1 to 6, the kinds and contents of the components used for forming the first adhesive layer and the second adhesive layer, the glass transition temperatures (Tg) of the first adhesive layer and the second adhesive layer, and the methods and conditions for forming the low surface energy region in the second adhesive layer were summarized and given in Tables 1 and 2 below. In Tables 1 and 2, 3,3'-DDS represents 3,3'-sufonyldianiline, 2-MI represents 2-methylimidazole, EA represents ethyl acetate, and the content of each of the components is based on parts by weight.

TABLE 1

| | | Examples | | | | | | | |
|---|---|---|---|---|---|---|---|---|---|
| | | 1 | 2 | 3 | 4 | 5 | 6 | 7 | 8 |
| First adhesive layer | DC7663 | 100 | 100 | 100 | 100 | 100 | 100 | 100 | 100 |
| | YP50EK35 | — | — | — | — | — | — | — | — |
| | DC7426 | 5.3 | 5.3 | 5.3 | 5.3 | 5.3 | 5.3 | 5.3 | 5.3 |
| | SYL-OFF4000 | 0.5 | 0.5 | 0.5 | 0.5 | 0.5 | 0.5 | 0.5 | 0.5 |
| | AK-DA | — | — | — | — | — | — | — | — |
| | Toluene | 50 | 50 | 50 | 50 | 50 | 50 | 50 | 50 |
| | Tg (° C.) | 10 | 10 | 10 | 10 | 10 | 10 | 10 | 10 |
| Second adhesive layer | UVPSA1800 | 100 | 100 | 100 | 100 | 100 | — | — | — |
| | UVPSA5016 | — | — | — | — | — | 100 | — | — |
| | DC7662 | — | — | — | — | — | — | 100 | 100 |
| | SA3000 | — | — | — | — | — | — | — | — |
| | HCP1800 | — | — | — | — | — | — | — | — |
| | YD-128 | — | — | — | — | — | — | — | — |
| | DCPD-20 | — | — | — | — | 20 | — | — | — |
| | IR127 | 1 | 1 | 1 | 1 | 1 | 1 | — | — |
| | 3,3'-DDS | — | — | — | — | — | — | — | — |
| | AK-DA | 0.5 | 0.5 | 0.5 | 0.5 | 0.5 | 0.5 | — | 0.5 |
| | SYL-OFF4000 | — | — | — | — | — | — | 0.5 | — |
| | 2-MI | — | — | — | — | — | — | — | — |
| | EA | 100 | 100 | 100 | 100 | 100 | 100 | — | 100 |
| | Toluene | — | — | — | — | — | — | 50 | — |
| UV light intensity (mJ/cm$^2$) | | 150 | 200 | 300 | 500 | 150 | 150 | — | — |
| Heating time (min) | | | | | | | | | |
| Area ratio of low surface energy region (%) | | 9 | 9 | 9 | 9 | 9 | 9 | 9 | 9 |

TABLE 2

|  |  | Examples | | Comparative Examples | | | | | |
|---|---|---|---|---|---|---|---|---|---|
|  |  | 9 | 10 | 1 | 2 | 3 | 4 | 5 | 6 |
| First adhesive layer | DC7663 | 100 | 100 | — | 100 | 100 | 100 | 100 | 100 |
|  | YP50EK35 | — | — | 100 | — | — | — | — | — |
|  | DC7426 | 5.3 | 5.3 | — | 5.3 | 5.3 | 5.3 | 5.3 | 5.3 |
|  | SYL-OFF4000 | 0.5 | 0.5 | — | 0.5 | 0.5 | 0.5 | 0.5 | 0.5 |
|  | AK-DA | — | — | 0.5 | — | — | — | — | — |
|  | Toluene | 50 | 50 | 50 | 50 | 50 | 50 | 50 | 50 |
|  | Tg (° C.) | 10 | 10 | 90 | 10 | 10 | 10 | 10 | 10 |
| Second adhesive layer | UVPSA1800 | — | — | 100 | 100 | 100 | 100 | 100 | 100 |
|  | UVPSA5016 | — | — | — | — | — | — | — | — |
|  | DC7662 | — | — | — | — | — | — | — | — |
|  | SA3000 | 100 | 100 | — | — | — | — | — | — |
|  | HCP1800 | — | — | — | — | — | — | — | — |
|  | YD-128 | 30 | 30 | — | — | — | — | — | — |
|  | DCPD-20 | — | — | — | — | — | — | — | — |
|  | IR127 | — | — | 1 | 1 | 1 | 1 | 1 | 1 |
|  | 3,3'-DDS | 15 | 15 | — | — | — | — | — | — |
|  | AK-DA | 0.5 | 0.5 | 0.5 | 0.5 | 0.5 | 0.5 | 0.5 | 0.5 |
|  | SYL-OFF4000 | — | — | — | — | — | — | — | — |
|  | 2-MI | 0.3 | 0.3 | — | — | — | — | — | — |
|  | EA | 100 | 100 | 100 | 100 | 100 | 100 | 100 | 100 |
|  | Toluene | — | — | — | — | — | — | — | — |
| UV light intensity (mJ/cm$^2$) | | — | — | 150 | 0 | 50 | 100 | 150 | 150 |
| Heating time (min) | | 10 | 20 | — | — | — | — | — | — |
| Area ratio of low surface energy region (%) | | 9 | 9 | 9 | 9 | 9 | 9 | 0.8 | 81 |

Example 11

50 parts by weight of toluene and 50 parts by weight of rubber-based adhesive resin (R100, manufactured by AEKYUNG CHEMICAL Co., Ltd.) (polyisobutylene rubber (PIB)) were sequentially introduced into 100 parts by weight of rubber-based adhesive resin (R12, manufactured by AEKYUNG CHEMICAL Co., Ltd.) (polyisobutylene rubber (PIB)), and stirred for 2 hours. Thereafter, 5 parts by weight of a terpene-based tackifier (PX-1150N, manufactured by Yasuhara Corporation) was added thereto, and additionally stirred for 30 minutes to prepare an adhesive composition. The adhesive composition prepared in this way was applied onto a PET film (75 μm, ROH751, manufactured by Toray Advanced Material Co., Ltd) release-treated with silicone and then dried to form a first adhesive layer having a thickness of 20 μm.

Meanwhile, 100 parts by weight of ethyl acetate and 1 part by weight of a photoinitiator (IR127, manufactured by BASF Corporation) were sequentially introduced into 100 parts by weight of acrylic resin (UVPSA1800, manufactured by AEKYUNG CHEMICAL Co., Ltd.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. The adhesive composition prepared in this way was applied onto a PET film (75 μm, ROH751, manufactured by Toray Advanced Material Co., Ltd) release-treated with silicone and then dried to form a second adhesive layer having a thickness of 10 μm.

The first adhesive layer and the second adhesive layer were bonded to each other by a roll laminator (PHOTONEX SYNC 325, manufactured by GMP Corporation) such that their adhesion surfaces were in contact with each other, so as to manufacture a double-sided adhesive film for bonding heterogeneous substrates, having a total thickness of 30 μm.

The manufactured double-sided adhesive film was cut to a size of 100 mm×100 mm, and then a photomask made of steel special use stainless (SUS), having a size of 100 mm×100 mm and a thickness of 2 mm and provided at the center thereof with a hole having a size of 30 mm×30 mm was placed on the upper surface of the second adhesive layer. Then, the second adhesive layer was irradiated with UV in a light intensity of 150 mJ/cm$^2$ using a UV irradiator (high-pressure mercury lamp, manufactured by Litzen Corporation) to form a low surface energy region at the center of the second adhesive layer.

Example 12

A double-sided adhesive film for bonding heterogeneous substrates was manufactured in the same manner as in Example 11, except that the UV light intensity was changed to 200 mJ/cm$^2$.

Example 13

A double-sided adhesive film for bonding heterogeneous substrates was manufactured in the same manner as in Example 11, except that the UV light intensity was changed to 300 mJ/cm$^2$.

Example 14

A double-sided adhesive film for bonding heterogeneous substrates was manufactured in the same manner as in Example 11, except that the UV light intensity was changed to 500 mJ/cm$^2$.

Example 15

50 parts by weight of toluene and 50 parts by weight of rubber-based adhesive resin (R100, manufactured by AEKYUNG CHEMICAL Co., Ltd.) (polyisobutylene rubber (PIB)) were sequentially introduced into 100 parts by weight of rubber-based adhesive resin (R12, manufactured by AEKYUNG CHEMICAL Co., Ltd.) (polyisobutylene rubber (PIB)), and stirred for 2 hours. Thereafter, 5 parts by weight of a terpene-based tackifier (PX-1150N, manufactured by Yasuhara Corporation) was added thereto, and additionally stirred for 30 minutes to prepare an adhesive composition. The adhesive composition prepared in this way was applied onto a PET film (75 μm, ROH751, manufactured by Toray Advanced Material Co., Ltd.) release-treated with silicone and then dried to form a first adhesive layer having a thickness of 20 μm.

Meanwhile, 50 parts by weight of toluene was introduced into 100 parts by weight of silicone-based resin (DC7662, manufactured by Dow Corning Corporation), and then stirred for 2 hours. Thereafter, 0.5 parts by weight of a platinum catalyst (SYL-OFF 4000 CATALYST, manufactured by Dow Corning Corporation) was added thereto and additionally stirred for 30 minutes to prepare an adhesive composition. The adhesive composition prepared in this way was applied onto a PET film (75 μm, manufactured by Toray Advanced Material Co., Ltd) release-treated with fluorine by a screen printing method using a 200 mesh screen having a size of 30 mm×30 mm and then dried to form a low surface energy region of a second adhesive layer having a thickness of 10 μm.

100 parts by weight of ethyl acetate were introduced into 100 parts by weight of acrylic resin (SA3000, manufactured by SAMHWA PAINTS INDUSTRIAL CO., LTD.), and then stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. After the low surface energy region of the second adhesive layer was aligned to overlap a masking portion, the adhesive composition prepared in this way was applied onto a PET film (75 μm, manufactured by Toray Advanced Material Co., Ltd) release-treated with fluorine by a screen printing method using a 200 mesh screen having a size of 100 mm×100 mm and including a masked center portion of 30 mm×30 mm and then dried to form a high surface energy region of a second adhesive layer having a thickness of 10 μm outside the low surface energy region.

The first adhesive layer and the second adhesive layer were bonded to each other by a roll laminator (PHOTONEX SYNC 325, manufactured by GMP Corporation) such that their adhesion surfaces were in contact with each other, so as to manufacture a double-sided adhesive film for bonding heterogeneous substrates, having a total thickness of 30 μm.

Example 16

100 parts by weight of ethyl acetate were introduced into 100 parts by weight of acrylic resin (HCA1800, manufactured by AEKYUNG CHEMICAL Co., Ltd.), and then stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 15, except that after the low surface energy region of the second adhesive layer according to Example 15 was aligned to overlap a masking portion, the adhesive composition prepared in this way was applied onto a PET film (75 μm, manufactured by Toray Advanced Material Co., Ltd) release-treated with fluorine by a screen printing method using a 200 mesh screen having a size of 100 mm×100 mm and including a masked center portion of 30 mm×30 mm and then dried to form a high surface energy region of a second adhesive layer having a thickness of 10 μm outside the low surface energy region.

Example 17

A double-sided adhesive film for bonding heterogeneous substrates was manufactured in the same manner as in Example 11, except that the size of the UV irradiation area was changed to 15 mm×15 mm.

Example 18

A double-sided adhesive film for bonding heterogeneous substrates was manufactured in the same manner as in Example 11, except that the size of the UV irradiation area was changed to 82.5 mm×82.5 mm.

Example 19

50 parts by weight of toluene was introduced into 100 parts by weight of rubber-based adhesive resin (7001, manufactured by SC Tech Corporation) (styrene-isoprene-styrene rubber (SISR)), and stirred for 2 hours. Thereafter, 5 parts by weight of a terpene-based tackifier (PX-1150N, manufactured by Yasuhara Corporation) was added thereto, and additionally stirred for 30 minutes to prepare an adhesive composition. A double-sided adhesive film for bonding heterogeneous substrates was manufactured in the same manner as in Example 11, except that the adhesive composition prepared in this way was applied onto a PET film (75 μm, ROH751, manufactured by Toray Advanced Material Co., Ltd) release-treated with silicone and then dried to form a first adhesive layer having a thickness of 20 μm.

Example 20

50 parts by weight of toluene was introduced into 100 parts by weight of rubber-based adhesive resin (7001-1, manufactured by SC Tech Corporation) (styrene-isoprene-styrene rubber (SISR)), and stirred for 2 hours. Thereafter, 5 parts by weight of a terpene-based tackifier (PX-1150N, manufactured by Yasuhara Corporation) was added thereto, and additionally stirred for 30 minutes to prepare an adhesive composition. A double-sided adhesive film for bonding heterogeneous substrates was manufactured in the same manner as in Example 11, except that the adhesive composition prepared in this way was applied onto a PET film (75 μm, ROH751, manufactured by Toray Advanced Material Co., Ltd) release-treated with silicone and then dried to form a first adhesive layer having a thickness of 20 μm.

Comparative Example 7

50 parts by weight of toluene was introduced into 100 parts by weight of phenoxy resin (YP50EK35, manufactured by KUKDO CHEMICAL CO., LTD.), and stirred for 2 hours. Thereafter, 0.5 parts by weight of an isocyanate-based thermal curing agent (AK-DA, manufactured by AEKYUNG CHEMICAL Co., Ltd.) was added thereto, and additionally stirred for 30 minutes to prepare an adhesive composition. A double-sided adhesive film for bonding heterogeneous substrates was manufactured in the same manner as in Example 11, except that the adhesive composition prepared in this way was applied onto a PET film (75 μm, ROH751, manufactured by Toray Advanced Material Co., Ltd) release-treated with silicone and then dried to form a first adhesive layer having a thickness of 10 μm (that is, only the method of forming the first adhesive layer was changed).

Comparative Example 8

A double-sided adhesive film for bonding heterogeneous substrates was manufactured in the same manner as in Example 11, except that UV was not irradiated to the second adhesive layer.

Comparative Example 9

A double-sided adhesive film for bonding heterogeneous substrates was manufactured in the same manner as in Example 11, except that the UV light intensity was changed to 500 mJ/cm².

Comparative Example 10

A double-sided adhesive film for bonding heterogeneous substrates was manufactured in the same manner as in Example 11, except that the UV light intensity was changed to 100 mJ/cm².

Comparative Example 11

A double-sided adhesive film for bonding heterogeneous substrates was manufactured in the same manner as in Example 11, except that the size of the UV irradiation area was changed to 9 mm×9 mm.

Comparative Example 12

A double-sided adhesive film for bonding heterogeneous substrates was manufactured in the same manner as in Example 11, except that the size of the UV irradiation area was changed to 90 mm×90 mm.

Comparative Example 13

50 parts by weight of toluene was introduced into 100 parts by weight of rubber-based adhesive resin (7501-2, manufactured by SC Tech Corporation) (styrene-butadiene-styrene rubber (SBSR)), and stirred for 2 hours. Thereafter, 5 parts by weight of a terpene-based tackifier (PX-1150N, manufactured by Yasuhara Corporation) was added thereto, and additionally stirred for 30 minutes to prepare an adhesive composition. A double-sided adhesive film for bonding heterogeneous substrates was manufactured in the same manner as in Example 11, except that the adhesive composition prepared in this way was applied onto a PET film (75 μm, ROH751, manufactured by Toray Advanced Material Co., Ltd) release-treated with silicone and then dried to form a first adhesive layer having a thickness of 20 μm.

In Examples 11 to 20 and Comparative Examples 7 to 13, the kinds and contents of the components used for forming the first adhesive layer and the second adhesive layer, the glass transition temperatures (Tg) of the first adhesive layer and the second adhesive layer, and the methods and conditions for forming the low surface energy region in the second adhesive layer were summarized and given in Tables 3 and 4 below. In Tables 3 and 4, EA represents ethyl acetate, and the content of each of the components is based on parts by weight.

TABLE 3

| | | Examples | | | | | | | | | |
|---|---|---|---|---|---|---|---|---|---|---|---|
| | | 11 | 12 | 13 | 14 | 15 | 16 | 17 | 18 | 19 | 20 |
| First adhesive layer | R12 | 100 | 100 | 100 | 100 | 100 | 100 | 100 | 100 | — | — |
| | R100 | 50 | 50 | 50 | 50 | 50 | 50 | 50 | 50 | — | — |
| | 7001 | — | — | — | — | — | — | — | — | 100 | — |
| | 7001-1 | — | — | — | — | — | — | — | — | — | 100 |
| | PX-1150N | 5 | 5 | 5 | 5 | 5 | 5 | 5 | 5 | 5 | 5 |
| | Toluene | 50 | 50 | 50 | 50 | 50 | 50 | 50 | 50 | 50 | 50 |
| | Tg (° C.) | −40 | −40 | −40 | −40 | −40 | −40 | −40 | −40 | 5 | −60 |
| Second adhesive layer | UVPSA1800 | 100 | 100 | 100 | 100 | — | — | — | — | 100 | 100 | 100 | 100 |
| | DC7662 | — | — | — | — | 100 | — | 100 | — | — | — | — | — |
| | SA3000 | — | — | — | — | — | 100 | — | — | — | — | — | — |
| | HCA1800 | — | — | — | — | — | — | — | 100 | — | — | — | — |
| | IR127 | 1 | 1 | 1 | 1 | — | — | — | 1 | 1 | 1 | 1 | 1 |
| | AK-DA | 0.5 | 0.5 | 0.5 | 0.5 | — | 0.5 | — | 0.5 | 0.5 | 0.5 | 0.5 | 0.5 |
| | SYL-OFF4000 | — | — | — | — | 0.5 | — | 0.5 | — | — | — | — | — |
| | EA | 100 | 100 | 100 | 100 | — | 100 | — | 100 | 100 | 100 | 100 | 100 |
| | Toluene | — | — | — | — | 50 | — | 50 | — | — | — | — | — |
| UV light intensity (mJ/cm²) | | 150 | 200 | 300 | 500 | — | — | — | — | 150 | 150 | 150 | 150 |
| Area ratio of low surface energy region (%) | | 9 | 9 | 9 | 9 | 9 | 9 | 2.3 | 68 | 9 | 9 |

TABLE 4

| | | Comparative Examples | | | | | | |
|---|---|---|---|---|---|---|---|---|
| | | 7 | 8 | 9 | 10 | 11 | 12 | 13 |
| First adhesive layer | R12 | — | 100 | 100 | 100 | 100 | 100 | — |
| | YP50EK35 | 100 | — | — | — | — | — | — |
| | R100 | — | 50 | 50 | 50 | 50 | 50 | — |
| | 7501-2 | — | — | — | — | — | — | 100 |
| | PX-1150N | — | 5 | 5 | 5 | 5 | 5 | 5 |
| | AK-DA | 0.5 | — | — | — | — | — | — |

TABLE 4-continued

|  |  | Comparative Examples | | | | | | |
|---|---|---|---|---|---|---|---|---|
|  |  | 7 | 8 | 9 | 10 | 11 | 12 | 13 |
| Second adhesive layer | Toluene | 50 | 50 | 50 | 50 | 50 | 50 | 50 |
|  | Tg (° C.) | 90 | −40 | −40 | −40 | −40 | −40 | 23 |
|  | UVPSA1800 | 100 | 100 | 100 | 100 | 100 | 100 | 100 |
|  | IR127 | 1 | 1 | 1 | 1 | 1 | 1 | 1 |
|  | AK-DA | 0.5 | 0.5 | 0.5 | 0.5 | 0.5 | 0.5 | 0.5 |
|  | EA | 100 | 100 | 100 | 100 | 100 | 100 | 100 |
| UV light intensity (mJ/cm$^2$) | | 150 | — | 50 | 100 | 150 | 150 | 150 |
| Area ratio of low surface energy region (%) | | 9 | 9 | 9 | 9 | 0.8 | 81 | 9 |

Evaluation Examples

Physical properties of each of the double-sided adhesive films for bonding heterogeneous substrates, manufactured in Examples 1 to 20 and Comparative Examples 1 to 13, were measured through Evaluation Examples below, and results thereof are given in Tables 5 to 8.

<Evaluation 1: Surface Energy (mN/m)>

Contact angles of surfaces of the low surface energy region and high surface energy region of each of the second adhesive layers to each of water ($H_2O$) as a hydrophilic solvent and diiodomethane ($CH_2I_2$) as a hydrophobic solvent were measured by a contact angle meter (Theta auto, manufactured by Hucom System Corporation) using Sessile Drop Technique, and then surface energy was calculated through Young-Dupre Equation (ASTM D5946).

<Evaluation 2: Storage Modulus (Pa)>

Viscoelasticities of the low surface energy region and the high surface energy region of each of the second adhesive layers were measured in a shear mode (1 Hz) using a dynamic viscoelasticity meter (ARES, manufactured by TA Instrument Corporation) (Frequency: 1 rad/sec). Specifically, the low surface energy regions and the high surface energy regions of each of the second adhesive layers were separated, a release film (that is, a release-treated PET film) was removed, and then the low surface energy regions were laminated and the high surface energy regions were laminated to prepare a sample having a thickness of 1 mm. The prepared laminated sample was perforated by a perforator having a diameter of 8 mm to be used as a test specimen. Measurement was carried out at a heating rate of 10° C./min in a temperature range of −70° C. to 150° C., and storage modulus of each sample at 25° C. was recorded.

<Evaluation 3: Adhesive Force to Substrate (Gf/in)>

Each of the first adhesive layer, and the low surface energy region and the high surface energy region of each of the second adhesive layers were separated, and were cut into strips having a size of 1 inch, respectively. However, the adhesive layers of Example 17 and the adhesive layers of Comparative Example 11, each of the areas separated therefrom having a size of less than 1 inch, were cut to the maximum size (the adhesive layers of Comparative Example 11 were cut to a size of 9 mm), and adhesive force was calculated by conversion into a size of 1 inch.

Adhesion surface of the strip prepared in this way was bonded to a PET film having a thickness of 50 μm (XD500P, manufactured by Toray Advanced Material Co., Ltd.) using a 2 kg rubber roller, and then left for 30 minutes. Thereafter, the release film of the other surface (that is, release-treated PET film) was peeled, and the peeled adhesion surface was bonded to the surface of Steel special use stainless (SUS) using a 2 kg rubber roller, and then left for 30 minutes. 180□ peel force of the test specimen prepared in the above method at room temperature were measured at a speed of 300 mm/min using a UTM apparatus (LF Plus, manufactured by Corins Tech Corporation).

<Evaluation 4: Dynamic Flexibility Evaluation>

Each of the double-sided adhesive films for bonding heterogeneous substrates was attached between two sheets of polyimide (PI) film having thickness of 50 μm (IF70, manufactured by SKC Kolon Corporation) to prepare a test specimen having a structure of PI film/double-sided adhesive film/PI film for dynamic flexibility evaluation. Dynamic flexibility evaluation of the test specimen prepared in this way was repeatedly performed a total of 100,000 times with 3,600 times per hour using a dynamic flexibility evaluation apparatus (5Axis Bending Test Machine, STS-5RT-100, manufactured by Science Town Corporation) with a curvature radius of 2.5 mm in a state where the folding axis of the apparatus is set to be located in the middle of the low surface energy region of the test specimen, and then whether the physical deformation of the folding portion of the test specimen occurred was evaluated.

Whether the physical deformation thereof occurred was evaluated by measuring waviness in a direction perpendicular to the folding direction of the test specimen closely adhered to a stage using a contact-type roughness meter (Surfcom 1500SD2, manufactured by Linear Technology Corporation). The waviness is defined as a difference between the maximum height and minimum height of the test specimen with respect to a horizontal line. When the waviness of the test specimen is 30 μm or more, it is determined that physical deformation of the PI film laminate occurs through dynamic flexibility evaluation.

In addition, each of the double-sided adhesive films for bonding heterogeneous substrates was attached between two sheets of release-treated polyimide (PI) film having thickness of 75 μm (ROT101, manufactured by Toray Advanced Material Co., Ltd.) to prepare a test specimen having a structure of PI film/double-sided adhesive film/PI film for dynamic flexibility evaluation. Dynamic flexibility evaluation of the test specimen prepared in this way was repeatedly performed a total of 100,000 times with 3,600 time per hour, using a dynamic flexibility evaluation apparatus (5Axis Bending Test Machine, STS-5RT-100, manufactured by Science Town Corporation) with a curvature radius of 2.5 mm in a state where the folding axis of the apparatus is set to be located in the middle of the low surface energy region of the test specimen, and then storage modulus of the folding portion of each of the test specimens was measured according to Evaluation Example 2.

TABLE 5

|  | Examples | | | | | | | |
| --- | --- | --- | --- | --- | --- | --- | --- | --- |
|  | 1 | 2 | 3 | 4 | 5 | 6 | 7 | 8 |
| Surface energy of the low surface energy region (E1, mN/m) | 22.8 | 21.4 | 20.6 | 19.7 | 18.9 | 20.2 | 17.9 | 17.9 |
| Surface energy of the high surface energy region (E2, mN/m) | 28.1 | 28.1 | 28.1 | 28.1 | 29.7 | 29.4 | 30.3 | 32.1 |
| Difference in surface energy between regions (E2-E1, mN/m) | 5.3 | 6.7 | 7.5 | 8.4 | 10.8 | 9.2 | 12.4 | 14.2 |
| Storage modulus of the low surface energy region (MPa) | 2.1 | 2.6 | 4.1 | 7.6 | 9.8 | 7.3 | 1.1 | 1.1 |
| Storage modulus of the high surface energy region (kPa) | 41 | 41 | 41 | 41 | 38 | 45 | 44 | 83 |
| Storage modulus of the low surface energy region (MPa) after dynamic flexibility evaluation | 2.5 | 3.0 | 4.9 | 9.2 | 12.3 | 8.8 | 1.2 | 1.2 |
| Storage modulus of the high surface energy region (kPa) after dynamic flexibility evaluation | 44 | 44 | 44 | 44 | 40 | 49 | 46 | 89 |
| Rate of change of storage modulus of the low surface energy region (%) before and after dynamic flexibility evaluation | 19.0 | 15.4 | 19.5 | 21.1 | 25.5 | 20.5 | 9.1 | 9.1 |
| Rate of change of storage modulus of the high surface energy region (%) before and after dynamic flexibility evaluation | 7.3 | 7.3 | 7.3 | 7.3 | 5.3 | 8.9 | 4.5 | 7.2 |
| Adhesive force of the first adhesive layer (gf/in) | 760 | 760 | 760 | 760 | 760 | 760 | 760 | 760 |
| Adhesive force of the low surface energy region of the second adhesive layer (A1, gf/in) | 25.4 | 15.6 | 10.1 | 7.3 | 7.5 | 9.0 | 2.6 | 2.6 |
| Adhesive force of the high surface energy region of the second adhesive layer (A2, gf/in) | 1270 | 1270 | 1270 | 1270 | 1340 | 990 | 1130 | 1090 |
| Difference in adhesive force between regions (A2-A1, gf/in) | 1245 | 1254 | 1260 | 1263 | 1333 | 981 | 1127 | 1087 |
| Waviness of test specimen (μm) after dynamic flexibility evaluation | 17 | 22 | 29 | 63 | 37 | 27 | 12 | 11 |
| Interlayer peeling or delamination | X | X | X | X | X | X | X | X |

TABLE 6

|  | Examples | | Comparative Examples | | | | | |
| --- | --- | --- | --- | --- | --- | --- | --- | --- |
|  | 9 | 10 | 1 | 2 | 3 | 4 | 5 | 6 |
| Surface energy of the low surface energy region (E1, mN/m) | 33.1 | 32.8 | 22.8 | 28.1 | 27.0 | 23.9 | 22.8 | 22.8 |
| Surface energy of the high surface energy region (E2, mN/m) | 38.7 | 38.7 | 28.1 | 28.1 | 28.1 | 28.1 | 28.1 | 28.1 |
| Difference in surface energy between regions (E2-E1, mN/m) | 5.6 | 5.9 | 5.3 | 0 | 1.1 | 4.2 | 5.3 | 5.3 |
| Storage modulus of the low surface energy region (MPa) | 5.1 | 7.6 | 2.1 | 0.04 | 0.28 | 0.91 | 2.1 | 2.1 |

TABLE 6-continued

|  | Examples | | Comparative Examples | | | | | |
| --- | --- | --- | --- | --- | --- | --- | --- | --- |
|  | 9 | 10 | 1 | 2 | 3 | 4 | 5 | 6 |
| Storage modulus of the high surface energy region (kPa) | 47 | 47 | 41 | 41 | 41 | 41 | 41 | 41 |
| Storage modulus of the low surface energy region (MPa) after dynamic flexibility evaluation | 6.0 | 9.2 | 2.5 | 0.04 | 0.29 | 1.1 | 2.5 | 2.5 |
| Storage modulus of the high surface energy region (kPa) after dynamic flexibility evaluation | 52 | 52 | 44 | 44 | 44 | 44 | 44 | 44 |
| Rate of change of storage modulus of the low surface energy region (%) before and after dynamic flexibility evaluation | 17.6 | 21.1 | 19.1 | 0 | 3.6 | 20.9 | 19.0 | 19.0 |
| Rate of change of storage modulus of the high surface energy region (%) before and after dynamic flexibility evaluation | 10.6 | 10.6 | 7.3 | 7.3 | 7.3 | 7.3 | 7.3 | 7.3 |
| Adhesive force of the first adhesive layer (gf/in) | 760 | 760 | 9 | 760 | 760 | 760 | 760 | 760 |
| Adhesive force of the low surface energy region of the second adhesive layer (A1, gf/in) | 22.4 | 10.3 | 25.4 | 1270 | 780 | 430 | 25.4 | 25.4 |
| Adhesive force of the high surface energy region of the second adhesive layer (A2, gf/in) | 1250 | 1250 | 1270 | 1270 | 1270 | 1270 | 1270 | 1270 |
| Difference in adhesive force between regions (A2-A1, gf/in) | 1228 | 1240 | 1245 | 0 | 490 | 840 | 1245 | 1245 |
| Waviness of test specimen (μm) after dynamic flexibility evaluation | 27 | 34 | 17 | 430 | 320 | 190 | 230 | 22 |
| Interlayer peeling or delamination | X | X | O | X | X | X | X | O |

Referring to Tables 5 and 6 above, in case of the double-sided adhesive films for bonding heterogeneous substrates manufactured in Examples 1 to 10, (i) the glass transition temperature of the first adhesive layer is lower than 10° C., so the adhesive force to the substrate is excellent, and (ii) the difference in surface energy between the low surface energy region occupying an area of 1% to 80% of the surface of the second adhesive layer and the high surface energy region occupying the residual area of the surface of the second adhesive layer is greater than 5 mN/m, so as to cause a difference in adhesive force to the same substrate.

Further, in case of the double-sided adhesive films for bonding heterogeneous substrates manufactured in Examples 1 to 3 and 5 to 10, it was found that finally, even after dynamic flexural evaluation, physical deformation or interlayer peeling of a laminated substrate does not occur.

However, in the case of Example 4 in which the low surface energy region is over-cured by excessively increasing UV light intensity and in the case of Example 11 in which the low-molecular-weight epoxy resin in the low surface energy area is over-cured by increasing heating time, it may be found that the storage modulus of the low surface energy region at 25° C. was high, and thus physical deformation of the laminated substrate occurred, but a difference in adhesive force to the same substrate caused by the difference in surface energy that is a main technology of the present disclosure occurred.

In the case of Comparative Example 1, when phenoxy resin having high glass transition temperature was applied as an adhesive resin of the first adhesive layer, wettability to the SUS substrate was not secured, so as to exhibit low adhesive force. As a result, after the dynamic flexibility evaluation, interlayer peeling or delamination occurred in the interface of the SUS substrate and the first adhesive layer.

Further, in the case of Comparative Examples 2 to 4, since the intensity of UV light forming the low surface energy region was low in the process of forming the second adhesive layer, the surface energy of the low surface energy region was not sufficiently lowered, and thus adhesive force to the substrate was high, so as not to cause selective dynamic interfacial delamination pursued by the present disclosure. As a result, after dynamic flexibility evaluation, stress due to deformation of the shape of the substrate concentrates and accumulate in the folding portion, so as to cause the physical deformation of the substrate itself.

In the case of Comparative Example 5, since the area of the low surface energy region in the second adhesive layer is less than 1% of the total area thereof, the region where dynamic interfacial delamination occurs is small, and thus stress due to the change in the shape of the substrate cannot be sufficiently distributed, and as a result, it was found that the shape of the substrate was physically deformed after the dynamic flexibility evaluation.

Further, in the case of Comparative Example 6, since the area of the low surface energy region in the second adhesive layer is 80% or more of the total area thereof, the area of the high surface energy region exhibiting high adhesive force to the substrate was relatively small. As a result of this, after dynamic flexibility evaluation, a phenomenon in which the folded portion of the substrate, that is, the portion of the low surface energy region is lifted up from the substrate occurred, and thus there was a problem that the physical deformation of the substrate due to interlayer peeling was visually recognized from outward appearance.

TABLE 7

| | Examples | | | | | | | | | |
|---|---|---|---|---|---|---|---|---|---|---|
| | 11 | 12 | 13 | 14 | 15 | 16 | 17 | 18 | 19 | 20 |
| Surface energy of the low surface energy region (E1, mN/m) | 22.7 | 21.4 | 20.7 | 20.3 | 18.4 | 18.6 | 22.0 | 23.1 | 20.5 | 21.0 |
| Surface energy of the high surface energy region (E2, mN/m) | 28.3 | 28.4 | 28.1 | 28.2 | 30.6 | 31.1 | 28.1 | 28.4 | 29.5 | 28.2 |
| Difference in surface energy between regions (E2-E1, mN/m) | 5.6 | 7.0 | 7.4 | 7.9 | 12.5 | 12.5 | 6.1 | 5.3 | 9.0 | 7.2 |
| Storage modulus of the low surface energy region (MPa) | 2.5 | 2.8 | 4.0 | 7.1 | 1.0 | 1.0 | 2.6 | 2.5 | 3.6 | 2.1 |
| Storage modulus of the high surface energy region (kPa) | 48 | 42 | 49 | 49 | 42 | 66 | 47 | 50 | 69 | 47 |
| Storage modulus of the low surface energy region (MPa) after dynamic flexibility evaluation | 2.8 | 3.1 | 4.5 | 8.1 | 1.1 | 1.1 | 2.9 | 2.8 | 3.9 | 2.4 |
| Storage modulus of the high surface energy region (kPa) after dynamic flexibility evaluation | 49 | 44 | 48 | 48 | 44 | 68 | 48 | 52 | 72 | 50 |
| Rate of change of storage modulus of the low surface energy region (%) before and after dynamic flexibility evaluation | 12.0 | 10.7 | 12.5 | 14.1 | 10.0 | 11.1 | 11.5 | 12.0 | 8.3 | 14.3 |
| Rate of change of storage modulus of the high surface energy region (%) before and after dynamic flexibility evaluation | 2.1 | 4.8 | 2.0 | 2.0 | 4.8 | 3.0 | 2.1 | 4.0 | 4.3 | 6.4 |
| Adhesive force of the first adhesive layer (gf/in) | 960 | 960 | 960 | 960 | 960 | 960 | 960 | 960 | 750 | 1350 |
| Adhesive force of the low surface energy region of the second adhesive layer (A1, gf/in) | 15 | 14 | 10 | 7 | 6 | 6 | 13 | 15 | 14 | 15 |

TABLE 7-continued

| | Examples | | | | | | | | | |
|---|---|---|---|---|---|---|---|---|---|---|
| | 11 | 12 | 13 | 14 | 15 | 16 | 17 | 18 | 19 | 20 |
| Adhesive force of the high surface energy region of the second adhesive layer (A2, gf/in) | 1270 | 1220 | 1190 | 1230 | 1100 | 1040 | 1230 | 1220 | 1240 | 1210 |
| Difference in adhesive force between regions (A2-A1, gf/in) | 1255 | 1206 | 1180 | 1223 | 1094 | 1034 | 1217 | 1205 | 1226 | 1195 |
| Waviness of test specimen (μm) after dynamic flexibility evaluation | 16 | 19 | 33 | 62 | 19 | 21 | 48 | 50 | 55 | 38 |
| Interlayer peeling or delamination | X | X | X | X | X | X | X | X | X | X |

TABLE 8

| | Comparative Examples | | | | | | |
|---|---|---|---|---|---|---|---|
| | 7 | 8 | 9 | 10 | 11 | 12 | 13 |
| Surface energy of the low surface energy region (E1, mN/m) | 22.8 | 28.1 | 26.3 | 24.1 | 21.8 | 21.9 | 22.2 |
| Surface energy of the high surface energy region (E2, mN/m) | 28.1 | 28.2 | 28.1 | 28.5 | 28.3 | 28.2 | 27.8 |
| Difference in surface energy between regions (E2-E1, mN/m) | 5.3 | 0.1 | 1.8 | 4.4 | 6.5 | 6.3 | 5.6 |
| Storage modulus of the low surface energy region (MPa) | 2.1 | 0.1 | 0.2 | 0.8 | 2.3 | 2.1 | 2.3 |
| Storage modulus of the high surface energy region (kPa) | 41 | 44 | 43 | 41 | 41 | 49 | 48 |
| Storage modulus of the low surface energy region (MPa) after dynamic flexibility evaluation | 2.5 | 0.1 | 0.3 | 1.1 | 2.7 | 2.5 | 2.6 |
| Storage modulus of the high surface energy region (kPa) after dynamic flexibility evaluation | 44 | 42 | 42 | 44 | 42 | 45 | 51 |
| Rate of change of storage modulus of the low surface energy region (%) before and after dynamic flexibility evaluation | 19.1 | 0.0 | 50.0 | 37.5 | 17.4 | 19.0 | 13.0 |
| Rate of change of storage modulus of the high surface energy region (%) before and after dynamic flexibility evaluation | 7.3 | 4.5 | 2.3 | 7.3 | 2.4 | −8.2 | 6.3 |
| Adhesive force of the first adhesive layer (gf/in) | 9 | 960 | 960 | 960 | 960 | 960 | 500 |
| Adhesive force of the low surface energy region of the second adhesive layer (A1, gf/in) | 25.4 | 1280 | 720 | 380 | 16 | 14 | 16 |

TABLE 8-continued

|  | Comparative Examples | | | | | | |
| --- | --- | --- | --- | --- | --- | --- | --- |
|  | 7 | 8 | 9 | 10 | 11 | 12 | 13 |
| Adhesive force of the high surface energy region of the second adhesive layer (A2, gf/in) | 1270 | 1200 | 1210 | 1280 | 1220 | 1210 | 1230 |
| Difference in adhesive force between regions (A2-A1, gf/in) | 1245 | 80 | 490 | 900 | 1204 | 1196 | 1217 |
| Waviness of test specimen (μm) after dynamic flexibility evaluation | 17 | 520 | 430 | 260 | 220 | 260 | 750 |
| Interlayer peeling or delamination | O | X | X | X | X | O | X |

Referring to Tables 7 and 8 above, in case of the double-sided adhesive films for bonding heterogeneous substrates manufactured in Examples 11 to 20, (i) the glass transition temperature of the first adhesive layer is lower than 10° C., so the adhesive force to the substrate is excellent, and (ii) the difference in surface energy between the low surface energy region occupying an area of 1% to 80% of the surface of the second adhesive layer and the high surface energy region occupying the residual area of the surface of the second adhesive layer is greater than 5 mN/m, so as to cause a difference in adhesive force to the same substrate.

Further, in case of the double-sided adhesive films for bonding heterogeneous substrates manufactured in Examples 11 to 13 and 15 to 20, it was found that finally, even after dynamic flexural evaluation, physical deformation or interlayer peeling of a laminated substrate does not occur.

Meanwhile, in case of the double-sided adhesive film for bonding heterogeneous substrates manufactured in Example 14, the low surface energy region was over-cured by excessively increasing the intensity of UV light, and thus physical deformation of the laminated substrate occurred after the dynamic flexibility evaluation, but interlayer peeling or delamination did not occur.

In the case of Comparative Examples 7 and 13, when phenoxy resin having high glass transition temperature of 20° C. or higher was used as an adhesive resin of the first adhesive layer. In the case of Comparative Example 7, wettability to the SUS substrate was not secured to exhibit low adhesive force, and as a result, after the dynamic flexibility evaluation, interlayer peeling or delamination occurred in the interface of the SUS substrate and the first adhesive layer. In the case of Comparative Example 13, it may be found that interlayer peeling or delamination did not occur, but physical deformation occurred after dynamic flexural evaluation due to low adhesive force.

Further, in the case of Comparative Examples 8 to 10, since the intensity of UV light forming the low surface energy region was low in the process of forming the second adhesive layer, the surface energy of the low surface energy region was not sufficiently lowered, and thus adhesive force to the substrate was high, so as not to cause selective dynamic interfacial delamination pursued by the present disclosure. As a result, after dynamic flexibility evaluation, stress due to deformation of the shape of the substrate concentrates and accumulate in the folding portion, so as to cause the physical deformation of the substrate itself.

In the case of Comparative Example 11, since the area of the low surface energy region in the second adhesive layer is less than 1% of the total area thereof, the area where dynamic interfacial delamination occurs is small, and thus stress due to the change in the shape of the substrate cannot be sufficiently distributed, and as a result, it was found that the shape of the substrate was physically deformed after the dynamic flexibility evaluation.

Further, in the case of Comparative Example 12, since the area of the low surface energy region in the second adhesive layer is 80% or more of the total area thereof, the area of the high surface energy region exhibiting high adhesive force to the substrate was relatively small. As a result of this, after dynamic flexibility evaluation, a phenomenon in which the folded portion of the substrate, that is, the portion of the low surface energy region is lifted up from the substrate occurred, and thus there was a problem that the physical deformation of the substrate due to interlayer peeling was visually recognized from outward appearance.

The present disclosure has been described with reference to the drawings and examples, but this is merely exemplary, and those skilled in the art will understand that various modifications and equivalent other embodiments are possible therefrom. Therefore, the true technical protection scope of the present disclosure should be determined by the technical spirit of the appended claims.

The invention claimed is:

1. A double-sided adhesive film for bonding heterogeneous substrates, the double-sided adhesive film comprising:
   a first adhesive layer; and
   a second adhesive layer disposed on the first adhesive layer and having adhesive force different from that of the first adhesive layer to the same substrate,
   wherein the first adhesive layer has a glass transition temperature of −70° C. or higher and lower than 20° C.,
      the second adhesive layer has a surface in which 1% or more and less than 80% of a total surface area is a low surface energy region, and a residual surface area is a high surface energy region, and
   a difference in surface energy between the two regions satisfies Equation 1 below:

$$5 \text{ mN/m} < E2 - E1 \qquad \text{[Equation 1]}$$

E1: surface energy of the low surface energy region, and
E2: surface energy of the high surface energy region,
   wherein, in the second adhesive layer, the low surface energy region has a storage modulus of 1 MPa or more and less than 10 MPa at 25° C., and the high surface energy region has a storage modulus of 1 kPa or more and less than 200 kPa at 25° C.

2. The double-sided adhesive film of claim 1, wherein the first adhesive layer includes an acrylic adhesive, a silicone-based adhesive, a urethane-based adhesive, a rubber-based adhesive resin, or a combination thereof.

3. The double-sided adhesive film of claim 1, wherein before and after evaluation of dynamic flexibility of the double-sided adhesive film, in the second adhesive layer, a rate of change of storage modulus of the low surface energy region at 25° C. is less than 20%, and a rate of change of storage modulus of the high surface energy region at 25° C. is less than 10%.

4. The double-sided adhesive film of claim 1, wherein, in the second adhesive layer, a difference between adhesive force of the low surface energy region and adhesive force of the high surface energy region to the same substrate satisfies Equation 2 below:

$$300 \text{ gf/in} < A2 - A1 \quad \text{[Equation 2]}$$

A1: adhesive force of the low surface energy region to the substrate, and
A2: adhesive force of the high surface energy region to the substrate.

5. The double-sided adhesive film of claim 4, wherein, in the second adhesive layer, the adhesive force (A1) of the low surface energy region to the substrate is less than 50 gf/in.

6. The double-sided adhesive film of claim 1, wherein, in the second adhesive layer, the low surface energy region is disposed to penetrate the high surface energy region in a thickness direction.

7. The double-sided adhesive film of claim 6, wherein, in the second adhesive layer, the low surface energy region is distributed inside the high surface energy region in the form of one or more islands.

8. The double-sided adhesive film of claim 1, wherein a total thickness of the double-sided adhesive film is 1 μm or more and less than 100 μm, and a ratio of a thickness of the second adhesive layer to a thickness of the first adhesive layer is 1% or more and less than 150%.

9. The double-sided adhesive film of claim 1, further comprising a base film disposed between the first adhesive layer and the second adhesive layer.

10. A laminated film, comprising the double-sided adhesive film of claim 1.

11. A display device, comprising the double-sided adhesive film of claim 1.

12. The display device of claim 11, wherein the display device is a flexible display device.

* * * * *